(12) United States Patent
Ikeda et al.

(10) Patent No.: US 6,824,571 B2
(45) Date of Patent: Nov. 30, 2004

(54) HYDROGEN ABSORBING ALLOY ELECTRODE, MANUFACTURING METHOD THEREOF, AND ALKALINE STORAGE BATTERY EQUIPPED WITH THE HYDROGEN ABSORBING ALLOY ELECTRODE

(75) Inventors: Yasuhiko Ikeda, Itano-gun (JP); Makoto Ochi, Tokushima (JP); Motoo Tadokoro, Itano-gun (JP); Teruhiko Imoto, Itano-gun (JP); Tetsuyuki Murata, Naruto (JP); Takashi Yamaguchi, Sumoto (JP); Yasumasa Kondou, Itano-gun (JP); Kiyoshi Morita, Komatsujima (JP); Kousuke Satoguchi, Tokushima (JP)

(73) Assignee: Sanyo Electric Co., Ltd., Osaka (JP)

(*) Notice: Subject to any disclaimer, the term of this patent is extended or adjusted under 35 U.S.C. 154(b) by 177 days.

(21) Appl. No.: 09/931,051

(22) Filed: Aug. 17, 2001

(65) Prior Publication Data
US 2002/0045097 A1 Apr. 18, 2002

(30) Foreign Application Priority Data

Aug. 18, 2000 (JP) .................................. P. 2000-248470
Sep. 22, 2000 (JP) .................................. P. 2000-288556
Jan. 31, 2001 (JP) .................................. P. 2001-024151

(51) Int. Cl.⁷ .............................................. H01M 6/00
(52) U.S. Cl. ................... 29/623.5; 29/623.1; 429/168; 429/169; 429/218.2; 429/206; 427/115
(58) Field of Search ........................... 29/623.5, 623.1; 429/157, 166, 168, 115, 169, 206, 218.2

(56) References Cited

U.S. PATENT DOCUMENTS 4,172,319 A  * 10/1979  Bloom et al. ............... 29/623.4

FOREIGN PATENT DOCUMENTS

JP            8-190930      *  7/1996

* cited by examiner

Primary Examiner—Laura Weiner
(74) Attorney, Agent, or Firm—Nixon & Vanderhye P.C.

(57) ABSTRACT

After coating a hydrogen absorbing alloy slurry obtained by kneading a hydrogen absorbing alloy powder 12a, a polyethylene oxide (PEO) powder as a binder 12b, and a suitable amount of water (a solvent for binder) to both surfaces of a metal core plate (active material holder) made of a punching metal, the core plate is dried. Then, after removing the active material layer 13 from the core plate 11 by a means such as cutting and the like, a definite amount of water (a solvent for binder) is sprayed to the cut surface (the exposed surface of the core plate 11) to attach the water to the cur surface followed by drying to provide a hydrogen absorbing alloy electrode 10, which is disposed at the outermost side of the electrode group.

7 Claims, 4 Drawing Sheets

(Prior Art)

HYDROGEN ABSORBING ALLOY ELECTRODE, MANUFACTURING METHOD THEREOF, AND ALKALINE STORAGE BATTERY EQUIPPED WITH THE HYDROGEN ABSORBING ALLOY ELECTRODE

BACKGROUND OF THE INVENTION

The present invention relates to a method of producing an alkaline storage battery equipped with an electrode group having alternately stacked positive electrode and negative electrode via separators, and particularly to a method of producing an alkaline storage battery, wherein the core plates of the electrodes disposed at the outermost sides of the electrode group are exposed and the electrode group is contained in a metal-made casing such that the exposed core plates are in contact with the metal-made outer casing. Further, the present invention relates to a hydrogen absorbing alloy electrode comprising an electrically conductive core plate having attached thereto mixture containing at least a hydrogen absorbing alloy powder and a binder and to the production method thereof, and also to an alkaline storage battery equipped with an electrode group formed laminating negative electrode each coated with a hydrogen absorbing alloy powder and positive electrodes via separators in a metal-made outer casing.

Recently, with the increase of small-sized potable instruments, the demand of secondary cells (storage batteries) capable of charging and discharging has been increased, and particularly, with small sizing and thinning of instruments, and increasing of necessity to use a space efficiently, the demand of a nickel-metal hydride battery obtained a large capacity battery has been rapidly increased. In the nickel-metal hydride battery of this kind, as shown in FIG. 3, electrode group 50 a formed by laminating a positive electrode 51 using nickel hydroxide as the active material and a negative electrode 52 using a hydrogen absorbing alloy as the active material via a separator 53 are contained together with an alkaline electrolyte in a metal-made outer casing (battery casing) 55, and the metal-made outer casing 55 is tightly sealed to provide a nickel-metal hydride battery 50. The negative electrode 52 is formed by coating an active material slurry made of a hydrogen absorbing alloy on both surfaces of a core plate 52a holding an active material.

The nickel-metal hydride battery 50 of the above-described structure has a fault that an oxygen gas generated when the positive electrode 5 is fully charged permeates through the separator 53 and diffuses in the negative electrode 52 to greatly deteriorates the negative electrode 52. Particularly, the deterioration of the active material layer 52b of the negative electrode 52, which does not face the positive electrode 51, that is the active material layer 52b of the negative electrode 52 disposed at the outermost side of the electrode group 50a facing the metal-made outer casing 55 becomes severe. This is because the active material layer 52b of the negative electrode 52 disposed at the outermost side of the electrode group 50a does not face the positive electrode 51, at charging, the progress of the charging reaction becomes later than the negative electrode 52 disposed at an intermediate portion. Thereby, when the positive electrode 51 is fully charged and an oxygen gas generates, the negative electrode 52 disposed at the outermost side of the electrode group 50a is attacked by the oxygen gas in a state the occluded amount of hydrogen is less than the negative electrode 52 disposed in an intermediate, whereby the deterioration becomes severe, and the cycle characteristics of the battery is lowered.

Also, because the active material layer 52b of the negative electrode 52 at the outermost side, which does not face the positive electrode 51, becomes a region of low electrochemical activity, which does not efficiently carry out the absorbing and releasing reaction of hydrogen at charge and discharge, the active material layer 52b becomes an active material layer which is not substantially effectively utilized. The formation of the region, wherein the active material is not effectively utilized, in the inside of the battery casing 55 is the fault of lower the volume energy density, which is very important for the battery. Particularly, because the nickel-metal hydride battery is designed such that the electrode capacity of the negative electrode is larger than that of the positive electrode for employing a sealed structure by absorbing an oxygen gas in the negative electrode, when a portion, which is not effectively utilized, is formed, the volume energy density is considerably lowered.

Thus, as shown in FIG. 4, a nickel-metal hydride battery 60 is proposed in Japanese Patent Laid-Open No. 255834/1998, wherein an electrode group 60a having stacked a positive electrodes 61 and a negative electrodes 61 via a separator 63 is placed in a battery casing 65, and a core plate exposed surface 62b is formed in such manner that an active material is disposed at the negative electrode 62 of the outermost side of the electrode group 60a, opposing to the positive-electrode 61, while an active material does not exist at the side, which does not face the positive electrode 61 and opposes to the battery casing 65. By employing such a construction, the amount of the active material disposed at the negative electrode 62 of the outermost side of the electrode group 60a become a half of the amount of the active material at the negative electrode of an intermediate disposed between positive electrodes 62, and the electrode capacity thereof becomes smaller than that of the negative electrode at the intermediate.

Because the side, which is disposed at the outermost side of the electrode group and faces the battery casing, does not face the positive electrode, the side becomes a region of low electrochemical activity and does not efficiently carry out the absorbing and releasing reaction of hydrogen, but because in the nickel-metal hydride battery 60, wherein the core plate exposure surface 62b is formed by removing the active material at the side disposed at the outermost side of the electrode group as described above, the active material can be dividedly added to each negative electrode 62 at an intermediate disposed between the positive electrodes 61, the formation of the portion which is not effectively utilized can be prevented, and lowering of the volume energy density can be prevented.

Also, in the nickel-metal hydride battery, wherein the core plate exposure surface 62b is formed by removing the active material at the side disposed at the outermost side of the electrode group as described above, because the core plate 62a, which becomes the exposed surface, functions as a metal cover covering the electrode group 60a, the electrode group 60a can be easily inserted in the battery casing 65 and falling off of the active material can be effectively prevented. This is because the core plate 62a functions as the metal cover is an electrically conductive plate material such as a punching metal, and the like, in the casing of inserting the electrode group 60a into the battery casing 65, it does not occur that the active material of the outermost side of the electrode group 60a falls off by being peeled off. Furthermore, because the inside surface of the battery casing 65 can be directly electrically contacted with the core plate 62a, the high-rate discharge characteristics can be improved.

Now, for producing the electrode having formed a core plate exposed surface, there are two kinds of methods, that is, a method, wherein at coating the active material slurry onto the core plate, the active material slurry is not coated on the side of the core plate, which becomes the core plate exposed surface, and a method, wherein after coating the active material slurry onto both surfaces of the core plate, the active material coated on the side becoming the core plate exposed surface is removed.

In the casing of forming a portion of coated the active material slurry on both surfaces of the core plate and a portion of coated the active material slurry on one surface only on one sheet of a core plate, when a method of previously not coating the active material slurry on the portion of becoming the core plate exposed surface is employed, at rolling, the situation that the both surface-coated portion (the thickness of the whole body is thick) is rolled but the one-surface-coated portion (the thickness of the whole body is thin) is not rolled occurs and the problem that the productivity is lowered occurs. On the other hand, in the method, wherein after coating the active material slurry on both surfaces of the core plate, the active material coated at the side becoming the core plate exposed surface is removed, since the thickness of the whole body is uniform, the whole body of the core plate is uniformly rolled and the problem as described above does not occur.

However, in the method that after coating the active material slurry on both surfaces of the core plate, the active material coated on the side becoming the core plate exposed surface, for forming the core plate exposed surface after drying and rolling, by a means of applying a blade to the active material layer, the active material layer of one side of the core plate coated with the active material is removed by scraping. Accordingly, the work of scraping off the hardened active material layer after drying is troublesome, and a problem that the adhesion of the active material layer at the opposite side to the side of scraping off the active material layer becomes insufficient, and the quality is lowered caused by falling off of the active material occurs.

In the nickel-metal hydride battery, a positive electrode using nickel hydroxide as an active material and a negative electrode using a hydrogen absorbing alloy may be rolled via a separator to form a spiral-form electrode group.

The negative electrode is formed by coating a hydrogen absorbing alloy slurry prepared by kneading a hydrogen absorbing alloy powder, a water-soluble binder, and pure water or water on both surfaces of an electrically conductive core plate made of a punching metal holding a hydrogen absorbing alloy layer, and usually is produced, after coating the hydrogen absorbing alloy slurry on both surfaces of the electrically conductive core plate, through a step of naturally drying at room temperature (about 25° C.). In this casing, there is a problem that when the electrode coated with the hydrogen absorbing alloy slurry is natural-dried, the drying speed is slow and usually until the electrode is dried, a long drying time of from about 5 to 6 hours is required, whereby the productivity of the electrode is lower.

Thus, for solving such a problem, a method of drying at a high temperature (about 60° C. or higher) after coating the hydrogen absorbing alloy slurry on both surfaces of the electrically conductive core plate has been proposed. When the electrode coated with the hydrogen absorbing alloy slurry is dried at a high temperature, the electrode can be dried for a drying time of from about 15 to 30 minutes, and the productivity of the electrode is improved. Thereafter, the negative electrode thus prepared and a positive electrode are rolled in a spiral form via a separator to form a spiral-form electrode group, and by inserting the spiral-form electrode group in a metal-made outer casing together with an alkaline electrolyte and tightly sealing the metal-made outer casing, a nickel-metal hydride battery is obtained.

To increase the drying speed of the electrode for improving the productivity of the electrode, it becomes necessary to dry the electrode at a high temperature as described above. However, when the electrode is dried at a high temperature, the evaporation speed becomes fast, whereby the water contained in the hydrogen absorbing alloy layer quickly moves to the electrode surface (drying surface side) from the inside of the electrode. Thereby, because the binder contained in the hydrogen absorbing alloy layer moves with the movement of the water, the binder is omnipresent at the surface of the electrode and is solidified. As the result thereof, there occurs a phenomenon that the amount of the binder in the hydrogen absorbing alloy layer in the vicinity of the electrically conductive core plate disposed at the center portion of the electrode is reduced.

There occurs a problem that because when the amount of the binder in the active material layer in the vicinity of the electrically conductive is reduced, the adhesive strength of the conductive core plate and the hydrogen absorbing alloy is lowered, in the casing of rolling in a spiral form and in the casing of inserting the spiral-form electrode group in a metal-made outer casing, the hydrogen absorbing alloy layer is liable to fall off from the conductive core plate. Particularly, in a battery that the peripheral portion of the negative electrode disposed at the outermost periphery of the spiral electrode group is not covered by a separator to expose the negative electrode, and the exposed negative electrode is directly contacted with a metal-made outer casing for obtained a battery of a high capacity by effectively utilizing the space in the metal-made outer casing, there occurs a problem that in the casing of inserting the spiral-form electrode group into the metal-made outer casing, the hydrogen absorbing alloy layer becomes more liable to fall off from the conductive core plate.

Further, for the nickel-metal hydride battery of this kind, it has been demanded to have a higher capacity and a higher output, and it has become indispensable to insure the high energy densities of the positive and negative electrodes. To insure the high energy densities of these positive and negative electrodes, it is necessary to increase the active material packing density as high as possible, and particularly, it is desirable that in the negative electrode, the packing density is at least 4.85 g/cm$^3$. However, in the casing of preparing a negative electrode having such a high packing density, when a hydrogen absorbing alloy powder having a large mean particle size is used, there occur problems that waviness occurs in the negative electrode obtained and creases occur in the negative electrode to lower the quality of the negative electrode obtained.

This is considered to be as follows. That is, because the negative electrode of a high packing density is produced after coating an active material sullry using the hydrogen absorbing alloy powder having a large mean particle size onto an electrically conductive core plate, when the negative electrode is pressed by applying a definite pressing force, the hydrogen absorbing alloy powder itself is not compressed and the volume of other than the hydrogen absorbing alloy powder is large, whereby the pressing force is unevenly distributed.

Thus, for solving such a problem, as the result of making various investigations on the method of preparing a negative electrode of a high packing density using a hydrogen absorbing alloy powder having a small mean particle size, it has been found that by using the hydrogen absorbing alloy powder having a mean particle size of not larger than 60 μm. the occurrences of waviness and creases in the negative electrode obtained can be restrained.

However, when the hydrogen absorbing alloy powder having a mean particle size of not larger than 60 μm is packed at a high density, the occurrence of waviness and creases in the negative electrode obtained can be restrained but, on the other hand, there occurs a problem that the adhesive strength of the negative electrode is lowered and the hydrogen absorbing alloy powder is fallen off from the negative electrode. This is considered to be caused by that with small sizing the mean particle size of the hydrogen absorbing alloy powder, the particle number of the hydrogen absorbing alloy powder is increased, and also the pressing force onto the negative electrode is increased by high-density packing, whereby the binder adhering the particles each other of the hydrogen absorbing alloy powder and adhering the hydrogen absorbing alloy powder and the electrically conductive core plate is crazed to cause discrepancy among the particles each other of the hydrogen absorbing alloy powder and between the hydrogen absorbing alloy powder and the conductive core plate.

Now, when a discrepancy (crazing of the binder) occurs among the particles each other of the hydrogen absorbing alloy powder or between the hydrogen absorbing alloy powder and the conductive core plate, there occurs a problem that in the casing of forming an electrode group by alternately laminating such negative electrodes and positive electrodes via separators, and in the casing of inserting the electrode group into a metal-made outer casing, the hydrogen absorbing alloy powder becomes liable to be fallen off from the negative electrodes. Particularly, in the battery that for making a battery of a high capacity by effectively utilizing the space in the metal-made outer casing, the peripheral portion of the negative electrode disposed at the outermost side of the electrode group is not covered by a separator to expose the negative electrode, and the exposed negative electrode is directly in contact with the metal-made outer casing, in the casing of inserting the electrode group into the metal-made outer casing, the hydrogen absorbing alloy powder becomes more liable to be fallen off from the negative electrode.

SUMMARY OF THE INVENTION

The present invention has been made for solving the above-described problems, and an object of the invention is to provide a method of producing a high-quality alkaline storage battery by increasing the adhesive strength of the active material layer of the opposite side to the side of scraping off the active material layer, whereby falling off the active material can be prevented.

Another object of the invention is to provide a production method capable of restraining lowering of the adhesive strength if a negative electrode even by improving the productivity by increasing the drying temperature of a negative electrode coated with a hydrogen absorbing alloy, whereby the hydrogen absorbing alloy layer can be prevented from falling off from an electrically conductive core plate, and an alkaline storage battery of a high quality is obtained.

Yet another object of the invention is to provide a method of producing an alkaline storage battery, which can restrain the occurrence of lowering the adhesive strength of negative electrodes even by using the hydrogen absorbing alloy powder having a small mean particle size for increasing the packing density of the active material, whereby the hydrogen absorbing alloy powder can be prevented from falling off from the negative electrode and obtain an alkaline storage battery of a good quality having a long life.

According to first aspect of the invention, a method of producing an alkaline storage battery includes a coating step of coating an active material slurry comprising an active material, a binder, and a solvent for the binder on both surfaces of the core plate, a drying step of drying the electrode coated with the active material slurry, an active material removing step of removing the active material of the side of forming the exposed surface of the core plate, and a solvent-attaching step of attaching the solvent for the binder from the exposed surface side of the core plate.

According to second aspect of the invention, a method of producing an alkaline storage battery includes a coating step of coating a hydrogen absorbing alloy slurry comprising the above-described hydrogen absorbing alloy powder, a binder, and a solvent for the binder onto both surfaces of an electrically conductive core plate to form a coated electrode, a drying step of drying the coated electrode to form a dry electrode, a solvent-attaching step of attaching the above-described solvent for the binder to the surface of the dry electrode, and a low-temperature drying step of drying the dry electrode at a temperature lower than the drying temperature in the above-described drying step.

According to third aspect of the invention, a hydrogen absorbing alloy electrode comprises an electrically conductive core plate having attached thereto a mixture containing at least a hydrogen absorbing alloy powder and a binder capable of re-dissolving, in that the mean particle size of the hydrogen absorbing alloy powder is not larger than 60 μm, and the packing density of the hydrogen absorbing alloy is at least 4.85 g/cm$^2$, and the hydrogen absorbing alloy powders each other and the hydrogen absorbing alloy powder and the electrically conductive core plate are adhered by the above-described binder capable of re-dissolving.

BRIEF DESCRIPTION OF THE DRAWINGS

FIG. 1A is a cross-sectional view showing the electrode of Example 1, FIG. 1B is a cross-sectional view showing the electrode of Example 2, FIG. 1C is a cross-sectional view showing the electrode of Example 3.

DETAILED DESCRIPTION OF THE PREFERRED EMBODIMENTS

First Embodiment

Figure 1A:
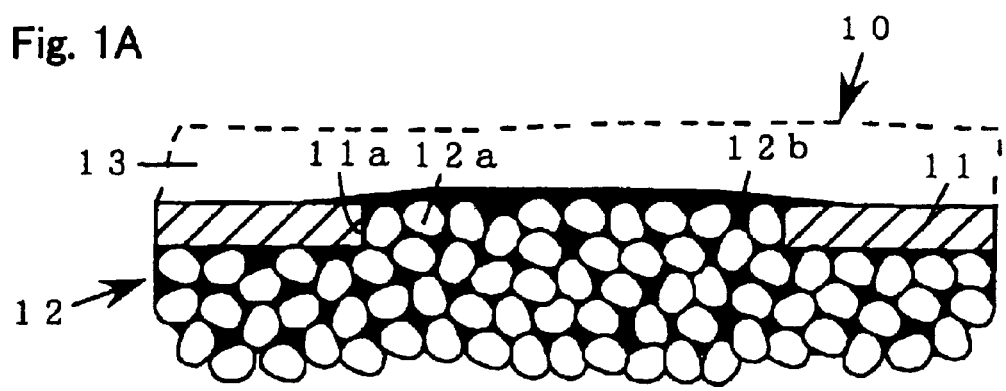
FIGS. 1A to 1C are enlarged cross-sectional views schematically showing the states of attaching an active material to the peripheries of holes formed in core plates (punching metal) of electrodes, particularly.

When the electrode coated with the active material slurry, at drying (drying in the casing becomes a high temperature for increasing the productivity), with moving of water contained in the active material layer, the binder (the binder added into the active material slurry) moves to the electrode surface (the dried surface side) and solidified, and the amount of the binder in the active material layer in the vicinity of the core plate disposed at the center portion of the electrode is reduced. Thereby, the adhesive force of the core plate and the active material is lowered and the active material becomes liable to fall off.

However, when the solvent for the binder (for example, water in the casing of a water-soluble bonder) is attached from the exposure surface side as in the invention, the solvent for the binder passes through many openings formed in the core plate, the solvent for the binder permeates into the active material layer which was not removed, the solidified binder is re-dissolved, and the concentration of the binder in the vicinity of the core plate is increased. Thereafter, when the active material layer is dried (since drying in this casing is carried out at room temperature the drying temperature becomes low), the adhesive force between the core plate and the active material in the vicinity of the core plate is increased, whereby the active material layer in the vicinity of the core plate becomes hard to be peeled off and falling off of the active material can be prevented.

Also, another method of producing an alkaline storage battery of the invention includes a coating step of coating an active material slurry comprising an active material, a binder, and a solvent for the binder on both surfaces of the core plate, a drying step of drying the electrode coated with the active material slurry, a solvent-attaching step of attaching the solvent for the binder from the active material layer side forming the exposed surface of the core plate, and an active material-removing step of removing the active material of the side forming the exposed surface of the core plate.

As described above, when the solvent for the binder (for example, water in the casing of a water-soluble binder) is attached from the active material layer side forming the exposed surface later, the solvent for the binder diffuses in the vicinity of the core plate, also a part of the diffused solvent passes through many openings formed in the core plate, and permeates into the active material layer which was not removed. Then, the binder, which was moved to the electrode surface with the movement of water at drying (drying in the casing becomes high temperature for increasing the productivity) and solidified, is re-dissolved and diffuses to the vicinity of the core plate. Thereafter, drying (since drying in the casing is carried out at room temperature, the drying temperature becomes low) is carried out, the binder diffused to the core plate is solidified, whereby the adhesion of the core plate and the active material layer is increased and the active material layer in the vicinity of the core plate becomes hard to be peeled off.

Accordingly, when the active material at the side attached with the solvent for the binder is removed later, the active material of the active material layer, which was not removed, in the vicinity of the core plate can maintain the state of strongly adhered to the core plate and the occurrence of falling off of the active material can be prevented.

In this case, when the active material-removing step is carried out, after the solvent-attaching step, in the state that the electrode attached with the solvent for the binder is undried, because the active material at the removing portion is softened, the active material can be easily removed, whereby the removing process of the active material becomes easy.

Also, when in the solvent-attaching step, a solution containing a binder (binder and the solvent for the binder) is attached to the exposed surface of the core plate, the solution containing the binder passes through many openings formed in the core plate and permeates into the active material layer which was not removed. Also, when the solution containing the binder is attached to the active material layer of the side forming the exposed surface of the core plate, the solution diffuses to the vicinity of the core plate and a part of the diffused solution passes through the many openings formed in the core plate and permeates into the active material layer which was not removed. Thereby, because the content of the binder of the active material layer in the vicinity of the core plate is increased, the core plate is more strongly adhere to the active material in the vicinity of the core plate substance. As the result thereof, the occurrence of peeling off of the active material from the core plate can be prevented, and peeling off of the active material can be more prevented.

Also, for attaching a definite amount of the solvent for the binder or the solution containing the binder onto the exposed surface of the core plate or the active material layer of the side forming the exposed surface of the core plate, it is desirable to attach the solvent for the binder or the solution containing the binder by spraying. Furthermore, because in general, the metal-made outer casing is also used as an external terminal of negative electrode, it is desirable that the electrode forming the core plate exposed surface is a hydrogen absorbing alloy electrode using a hydrogen absorbing alloy capable of reversibly carrying out electrochemical absorbing and desorbing of hydrogen as the active material.

Figure 1B:
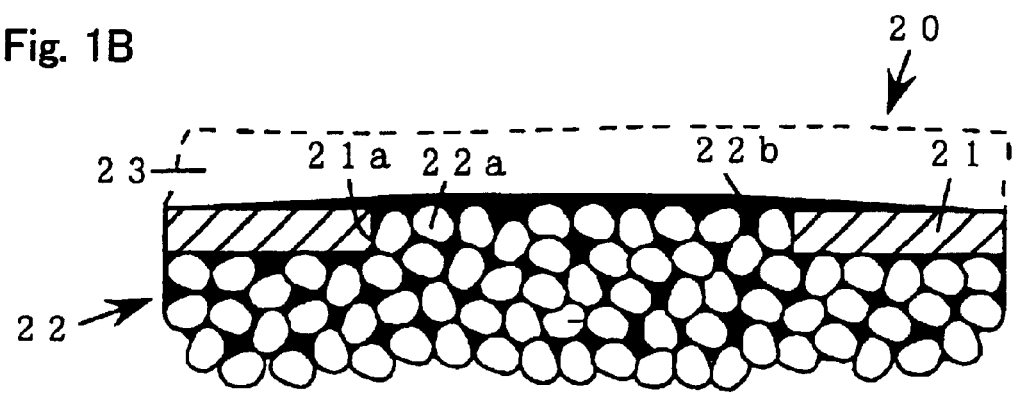
Figure 1C:
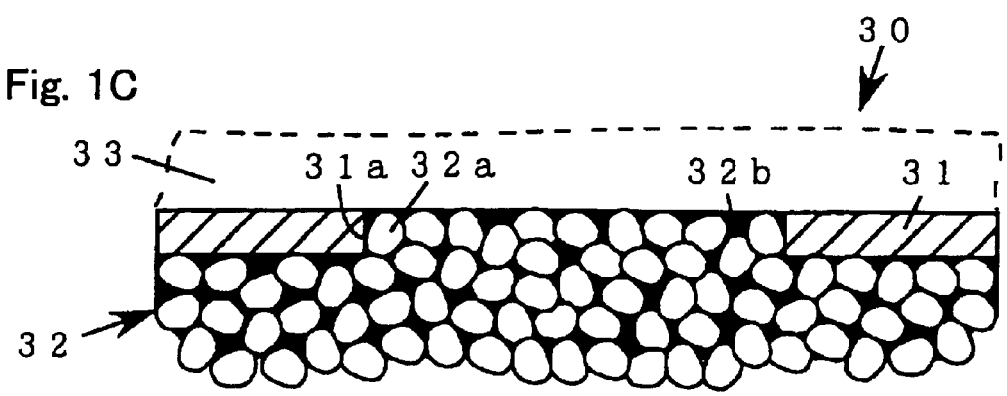
Figure 1D:
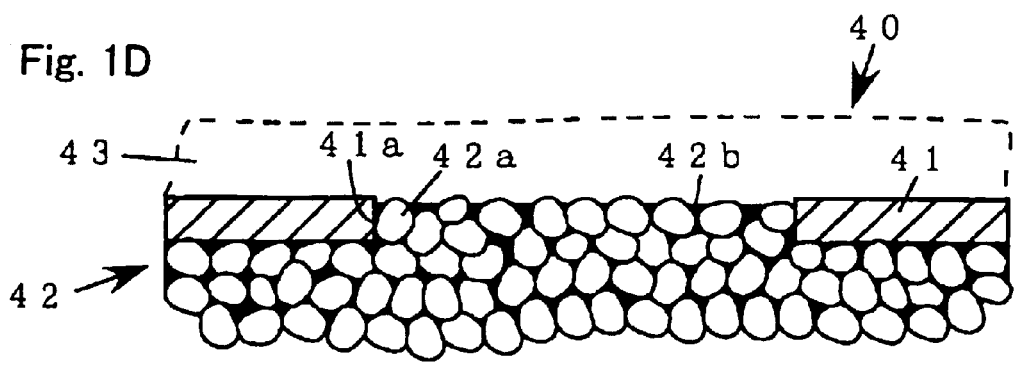
FIG. 1D is cross-sectional view showing the electrode of the comparative example.
Figure 2:
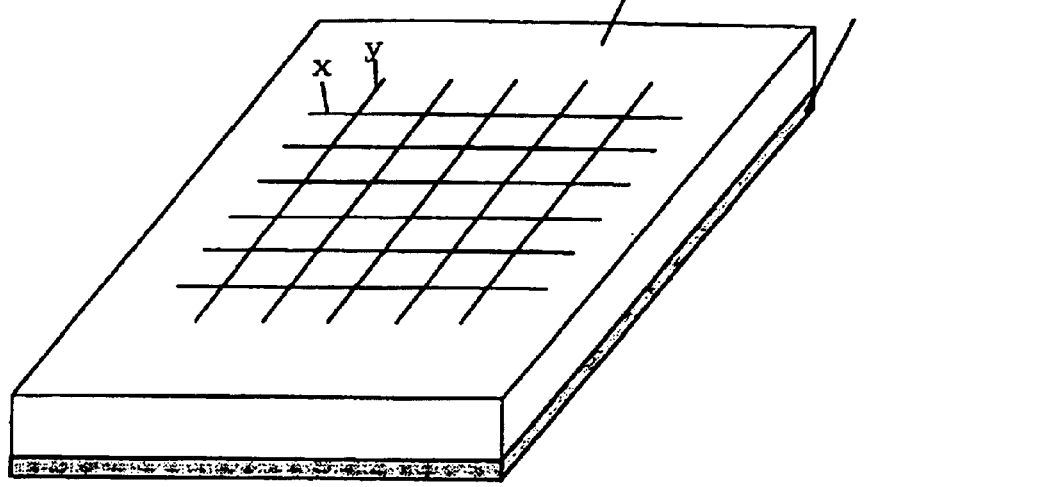
FIG. 2 is a slant view schematically showing the state of forming check-pattern kerfs on an active material layer for carrying out the falling off test of an active material.
Figure 3:
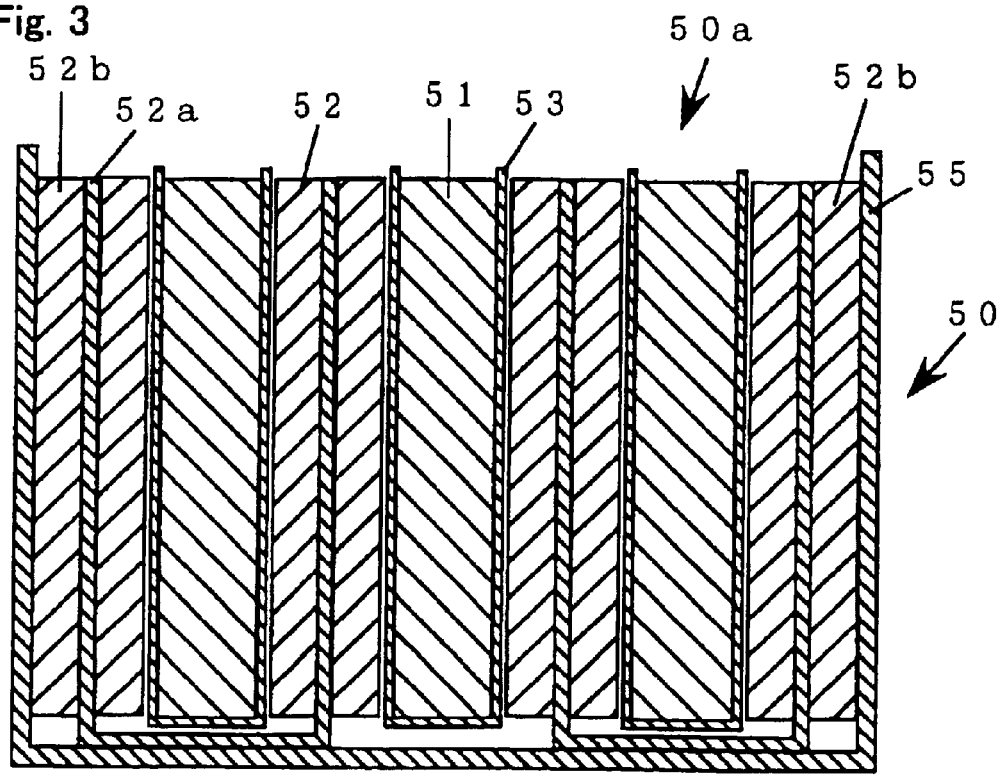
FIG. 3 is a cross-sectional view schematically showing a state of placing an electron group in an outer casing of prior art.
Figure 4:
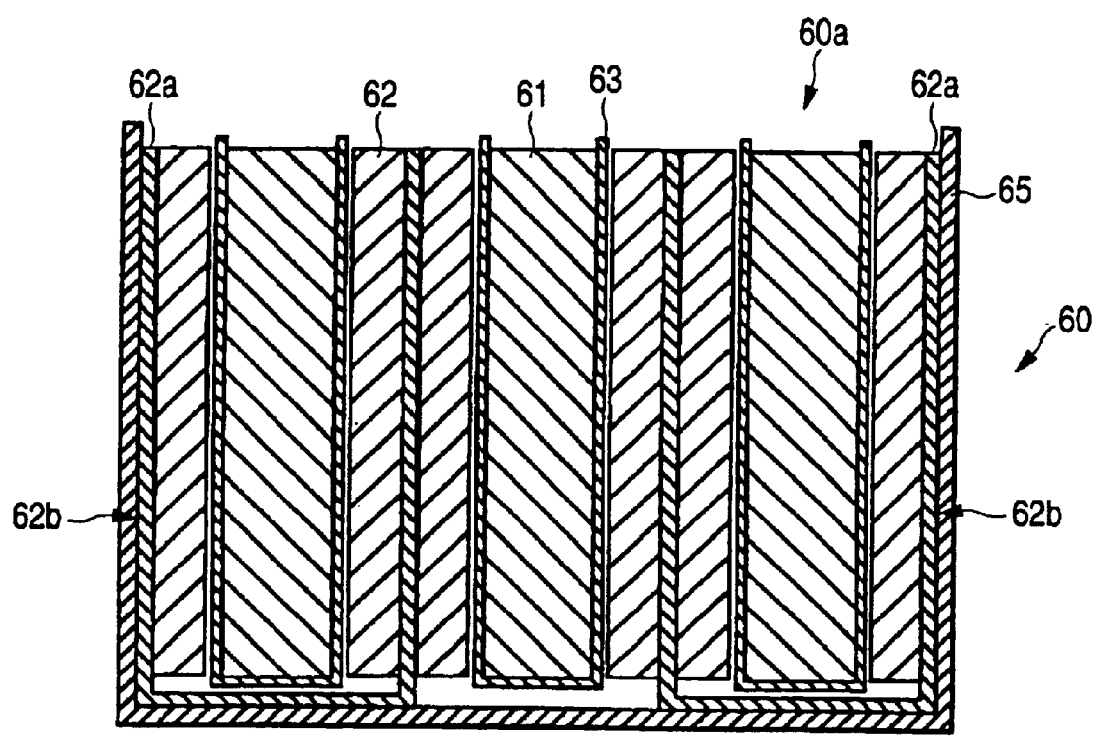
FIG. 4 is a cross-sectional view schematically showing a state of placing in an outer casing an electrode group having formed an exposed surface of a core plate holding the active material of electrode disposed at the outermost side.

Then, an embodiment of the casing of applying the present invention to a hydrogen absorbing alloy electrode is explained based on FIG. 1 and FIG. 2. In addition, FIGS. 1A to 1D are enlarged cross-sectional views schematically showing the states of attaching an active material to the peripheries of holes formed in core plates (punching metal) of electrodes, FIG. 1A is a cross-sectional view showing the electrode of Example 1, FIG. 1B is a cross-sectional view showing the electrode of Example 2, FIG. 1C is a cross-sectional view showing the electrode of Example 3, and FIG. 1D is cross-sectional view showing the electrode of the comparative example. Also, FIG. 2 is a slant view schematically showing the state of forming check-pattern kerfs on an active material layer for carrying out the falling off test of an active material.

1. Preparation of Hydrogen absorbing Alloy Powder:

Commercially available metal elements (Mm, Ni, Co, Al, and Mn) (in addition, Mm is a mischmetal) were weighted and mixed such that they became as $MmNi_{3.4}Co_{0.8}Al_{0.2}Mn_{0.6}$. After melting the mixture of the metal elements in a high-frequency melting furnace, the melt was poured into a mold and cooled to produce an ingot of a hydrogen absorbing alloy comprised of $MmNi_{3.4}Co_{0.8}Al_{0.2}Mn_{0.6}$. After roughly pulverizing the ingot of the hydrogen absorbing alloy, the particles were mechanically ground in an inert gas atmosphere until the mean particle size became about 50 μm to prepare a hydrogen absorbing alloy powder.

2. Preparation of Hydrogen Absorbing Alloy Electrode:

(1) EXAMPLE 1

To 99% by weight of the hydrogen absorbing alloy powder prepared as described above were added 1% by weight of a polyethylene oxide (PEO) powder as a binder and a suitable amount of water (the solvent for the binder (PEO)) followed by kneading to prepare a hydrogen absorbing alloy slurry.

Then, the hydrogen absorbing alloy slurry was coated on both surfaces of a metal core plate (active material holder) 11 made of a punching metal applied with nickel plating on the surface thereof and having formed opening 11a to provide an active material-coated electrode having formed active material layers 12 and 13. Thereafter, the electrode was dried (for example at 60° C. for 20 minutes) and rolled up to a thickness of 0.6 mm so that a dry rolled electrode 10 is prepared. In addition the coated amount of the hydrogen absorbing alloy slurry was controlled such that the density of the hydrogen absorbing alloy electrode after rolling became 5 g/cm³.

Then, after removing the active material layer 13 of the one surface of the dry rolled electrode 10 obtained from the core plate 11 by a means of cutting, etc., a definite amount (for example, the amount of an extent of wetting the active material layer-cut surface) of water (the solvent for the binder (PEO)) was sprayed from the side of the cut surface (the exposed surface of the core plate 11) to attach water to the cut surface. Thereafter, the electrode was dried at room temperature (about 25° C.) for 30 minutes to prepare a hydrogen absorbing alloy electrode 10 of Example 1 disposed at the outermost side of the electrode group.

In addition, when water was attached to the cut surface, as shown in FIG. 1A, the attached water (the solvent for the binder) passes through many openings 11a formed in the core plate 11 and the water permeates into the active material layer 12 in the vicinity of the core plate 11. Thereby, the binder 12b solidified in the active material layer 12 is re-dissolved and diffuses to the vicinity of the core plate 11. By drying the re-dissolved binder 12b, the binder is solidified to strongly adhere the active material particles 12a to the core plate 11 and also strongly adhere the active material particles 12a, 12a each other.

(2) EXAMPLE 2

After preparing the hydrogen absorbing alloy slurry by the same manner as in Example 1, the hydrogen absorbing alloy slurry was coated on both surfaces of a metal core plate (active material holder) 21 made of punching metal applied with nickel plating on the surface thereof and having formed an opening 21a to prepare an active material-coated electrode having formed active material layers 22 and 23 on both surfaces thereof. Thereafter, the electrode was dried (for example, at 60° C. for 20 minutes) and rolled up to a thickness of 0.6 mm to provide a dry rolled electrode 20. In addition, the coated amount of the hydrogen absorbing alloy slurry was controlled such that the density of the hydrogen absorbing alloy electrode after rolling became 5 g/cm³.

Then, after removing the active material layer 23 of the one surface of the dry rolled electrode 20 obtained from the core plate 21 by a means of cutting, etc., a definite amount (for example, the amount of an extent of wetting the active material layer-cut surface) of an aqueous solution of 0.5% PEO (the solvent for the binder (PEO)) was sprayed from the side of the cut surface (the exposed surface of the core plate 21) to attach the aqueous solution of PEO to the cut surface. Thereafter, the electrode was dried (for example, at room temperature (about 25° C.) for 30 minutes) to prepare a hydrogen absorbing alloy electrode 20 of Example 2 disposed at the outermost side of the electrode group.

In addition, when the aqueous solution of 0.5% PEO was attached to the cut surface, as shown in FIG. 1B, the attached aqueous solution of 0.5% PEO) passes through many openings 21a formed in the core plate 21 and the aqueous solution permeates into the active material layer 22 in the vicinity of the core plate 21. Thereby, the binder 22b solidified in the active material layer 22 is re-dissolved and diffuses to the vicinity of the core plate 21. By drying the re-dissolved binder 22b, the binder is solidified to more strongly adhere the active material particles 22a to the core plate 21 and also more strongly adhere the active material particles 22a, 22a each other.

(3) EXAMPLE 3

After preparing the hydrogen absorbing alloy slurry by the same manner as in Example 1, the hydrogen absorbing alloy slurry was coated on both surfaces of a metal core plate (active material holder) 31 made of punching metal applied with nickel plating on the surface thereof and having formed an opening 31a to prepare an active material-coated electrode having formed active material layers 32 and 33 on both surfaces thereof. Thereafter, the electrode was dried (for example, at 0° C. for 20 minutes) and rolled up to a thickness of 0.6 mm to provide a dry rolled electrode 30. In addition, the coated amount of the hydrogen absorbing alloy slurry was controlled such that the density of the hydrogen absorbing alloy electrode after rolling became 5 g/cm³.

Then, a definite amount (for example, the amount of an extent of swelling the surface of the active material layer 33) of water (the solvent for the binder (PEO)) was sprayed to the side of the active material layer (the active material layer removed by cutting later) 33 of the dry rolled electrode 30 obtained to attach water to the active material layer 33. Thereafter, the active material layer 33 was removed from the core plate 31 by a means such as cutting and the like to form a cut surface (the exposed surface of the core plate 31), and then the electrode was dried (for example, allowed to stand at room temperature (about 25° C.) for 30 minutes) to prepare the hydrogen absorbing alloy electrode 30 of Example 3, which is disposed at the outermost side of the electrode group.

In addition, because when water is incorporated in the active material layer 33, the active material layer 33 becomes soft, when the layer is cut off before the contained water is not dried, the cutting work becomes easy. Also, when by removing the active material layer 33 containing water to form the exposed surface of the core plate 31, as shown in FIG. 1C, the water attached to the active material layer 33 diffused in the active material layer 33, and also a part of the diffused water passes through many openings 31a formed in the core plate 31 and also diffuses to the active substrate 32 and permeates therein. Thereby, the bonder 32b solidified in the active material layer 33 and the active material layer 32 is re-dissolved and the binder diffuses to each of the active material layers 33 and 32. As the result thereof, at drying, the active material particles 32a are strongly adhered to the core plate 31 and also the active material particles are strongly adhered each other.

(4) COMPARATIVE EXAMPLE

On the other hand, after preparing the hydrogen absorbing alloy slurry by the same manner as in Example 1, the hydrogen absorbing alloy slurry was coated on both surfaces of a metal core plate (active material holder) 41 made of punching metal applied with nickel plating on the surface thereof and having formed an opening 41a to prepare an active material-coated electrode having formed active material layers 42 and 43 on both surfaces thereof. Thereafter, the electrode was dried (for example, at 60° C. for 20 minutes) and rolled up to a thickness of 0.6 mm to provide a dry rolled electrode 40. In addition, the coated amount of the hydrogen absorbing alloy slurry was controlled such that the density of the hydrogen absorbing alloy electrode after rolling became 5 g/cm$^3$. Then, the active material layer 43 pf the dry rolled electrode 40 was removed from the core plate 41 by a means such as cutting and the like to prepare the hydrogen absorbing alloy electrode 40 of the comparative example, which is disposed at the outermost side of the electrode group.

3. Strength Test of Hydrogen Absorbing Alloy Electrodes

Then, using ten electrodes each of the hydrogen absorbing alloy electrodes 10, 20, and 30 of Examples 1, 2, and 3 respectively and the hydrogen absorbing alloy electrodes 40 of the comparative example prepared as described above, a cutter was held at about 30 degree to the surface of each of the active material layers 12, 22, 32, and 42 of the electrodes 10, 20, 30, and 40 respectively. Then, by applying a load of about 250 g to the edge of the cutter, kerfs x and y were formed by notching each of the active material layers 12, 22, 32, and 42, as shown in FIG. 2. In addition, the intervals of the kerfs x or the kerfs y was 1 mm respectively, and ten kerfs x and ten kerfs y were formed as crossing at a right angle each other in each casing, whereby one hundred meshes were formed in a check pattern on each active material layer.

Then, using the ten electrodes each having formed one hundred meshes in a check pattern as described above of each of the electrodes 10, 20, 30, and 40, a falling test of free-falling each of the electrodes 10, 20, 30, and 40 from the position of a height of about 100 mm in the perpendicular direction to the coated surface of each of the active material layers 12, 22, 32, and 42 respectively was repeatedly carried out three times. Thereafter, the number of the fallen pieces of the meshes formed on each of the electrodes 10, 20, 30, and 40 was counted and the average values obtained were as shown in following Table 1.

TABLE 1

| Kind of Electrode | Number of Fallen Pieces of Meshes |
| --- | --- |
| Example 1 | 2 |
| Example 2 | 0 |
| Example 3 | 3 |
| Comparative Example | 40 |

As is clear from the results of above-described Table 1, it can be seen that the numbers of the fallen pieces of the meshes of the hydrogen absorbing alloy electrodes 10, 20, and 30 of Examples 1, 2, and 3 are less than the number of the fallen pieces of the meshes of the hydrogen absorbing alloy electrode 40 of the comparative example.

This is considered to be as follows. That is, as the hydrogen absorbing alloy electrodes 10 of Example 1, when water (the solvent for the binder (PEO)) is attached to the exposed surface of the core plate 11, as shown in FIG. 1A, the attached water (the solvent for the binder) passes through many openings 11a formed in the core plate 11, the water permeates in the active material layer 12 in the vicinity of the core plate 11, the binder 12 solidified in the active material layer 12 is re-dissolved and diffuses to the vicinity of the core plate 11. By drying the re-dissolved binder, the binder is solidified, whereby the active material particles 12a are strongly adhered to the core plate 11 and also, the active material particles 12a, 12a are strongly adhered each other.

Also, this is considered to be as follows. That is, as the hydrogen absorbing alloy electrodes 20 of Example 2, when the aqueous solution of PEO is attached to the exposed surface of the core plate 21, as shown FIG. 1B, the attached aqueous solution of PEO passes through many openings 21a formed in the core plate 21, the aqueous solution of PEO permeates into the active material layer 22 in the vicinity of the core plate 21, the binder 22b solidified in the active material layer 22 is re-dissolved and diffuses to the vicinity of the core plate 21. By drying the re-dissolved binder, the binder is solidified, whereby the active material particles 22a are more strongly adhered to the core plate 21 and also, the active material particles 22a, 22a are more strongly adhered each other.

Furthermore, this is also considered to be as follows. That is, as the hydrogen absorbing alloy electrode 30 of Example 3, when after attaching water to the active material layer 33, the exposed surface of the core plate 1 is formed by removing the active material layer 33, as shown in FIG. 1C, the water attached to the active material layer 33 diffuses and permeates into the active material layer 33, a part of the diffused water passes through many openings formed in the core plate 31 and also diffuses and permeates into the active material layer 32. Thereby, the binder 32b solidified in the active material layer 33 and the active material layer 32 is re-dissolved and diffuses to each of the active material layers 33 and 32. As the result thereof, at drying, the active material particles 32a are strongly adhered to the core plate 31 and also, the active material particles 32a, 32a are strongly adhered each other.

In this case, because when the active material layer 33 contains water, the active material layer 33 becomes soft, by cutting the active material layer 33 before the contained water is dried, the cutting work becomes easy.

In addition, in the above-described embodiments, the examples of using a water-soluble polyethylene oxide (PEO) as the binder were explained, but as the binder, other water-soluble binders than PEO or organic binders dissolved in organic solvents may be used. In the casing of using an organic binder, it is necessary that the solvent spraying the exposed surface of the core plate or the active material layer is an organic solvent.

Also, in the above-described embodiments, the examples of using MmNi$_{3.4}$Co$_{0.8}$Al$_{0.2}$Mn$_{0.6}$ as the hydrogen absorbing alloy were explained but as the hydrogen absorbing alloy, a hydrogen absorbing alloy can be properly selected from Ti—Ni base or La-(or Mm)—Ni base multi-element alloys. Also, in the above-described embodiments, examples of using the mechanically pulverized hydrogen absorbing alloy were explained but a hydrogen absorbing alloy prepared by an atomizing method may be used.

Second Embodiment

When a electrode coated with a hydrogen absorbing alloy slurry is dried (drying in this casing becomes is carried out at a high temperature for increasing the productivity), at drying, the binder is moved with the movement of water contained in the hydrogen absorbing alloy layer to the electrode surface (the dried surface side) and is solidified to reduce the amount of the binder in the hydrogen absorbing alloy layer in the vicinity of the electrically conductive core plate disposed at the center portion of the electrode. Thereby, the adhesive force of the conductive core plate and the hydrogen absorbing alloy layer is lowered and the hydrogen absorbing alloy becomes liable to fall off.

However, when the solvent for the binder (for example, pure water or water in the casing of a water-soluble binder) is attached to the surface of the dry electrode as in the invention, the solvent for the binder permeates into the hydrogen absorbing alloy layer, whereby the binder solidified at the surface of the electrode at drying is re-dissolved. Thereby, the re-dissolved binder diffuses to the vicinity of the electrically conductive core plate and the concentration of the binder in the vicinity of the conductive core plate is increased. Thereafter, when the electrode is dried at a temperature lower than the drying temperature of the drying step in the low-temperature drying step, because the evaporation speed is slow, the diffused binder is solidified without moving again. As the result thereof, the binder diffused to the vicinity of the conductive core plate is solidified in the vicinity of the conductive core plate, and the hydrogen absorbing alloy layer is strongly adhered to the conductive core plate. Thereby, the hydrogen absorbing alloy layer becomes hard to be peeled off and the occurrence of falling off of the hydrogen absorbing alloy can be prevented.

Also, in the case of forming the spiral-form electrode group, at the initiating portion and the end portion of rolling of negative electrode in the spiral electrode group, the hydrogen absorbing alloy layer is liable to be peeled off. Therefore, in the case of attaching the solvent for the binder to the surface of the electrode, it is preferable to attach the solvent to the initial portion or the end portion at least. In this casing, when the attaching amount of the solvent for the binder is too small, the binder solidified at drying does not diffuse to the vicinity of the conductive core plate, whereby the strong adhesion of the conductive core plate and the hydrogen absorbing alloy layer is not obtained. Also, when the attaching amount of the solvent for the binder is too much, the drying time becomes long to lower the productivity. Accordingly, it is preferred that the attaching amount of the solvent for binder, which is coated on the surface of the dry electrode is from $3 \times 10^{-5}$ $g/mm^2$ to $5 \times 10^{-5}$ $g/mm^2$ per unit area of the electrode.

An embodiment of the invention is explained below.

1. Preparation of Hydrogen Absorbing Alloy Powder:

Commercially available metal elements (Mm, Ni, Co, Al, and Mn)(in addition, Mm is a mischmetal) were weighted and mixed such that they became as $MmNi_{3.4}Co_{0.8}Al_{0.2}Mn_{0.6}$. After melting the mixture of the metal elements in a high-frequency melting furnace, the melt was poured into a mold and cooled to produce an ingot of a hydrogen absorbing alloy comprised of $MmNi_{3.4}Co_{0.8}Al_{0.2}Mn_{0.6}$. After roughly pulverizing the ingot of the hydrogen absorbing alloy, the particles were mechanically ground in an inert gas atmosphere until the mean particle size became about 50 $\mu m$ to prepare a hydrogen absorbing alloy powder. In addition, the mean particle size of the hydrogen absorbing alloy powder obtained was measured by a laser diffraction method.

2. Preparation of Hydrogen Absorbing Alloy Electrode:

(1) EXAMPLE 1

To 99% by weight of the hydrogen absorbing alloy powder prepared as described above were added 1% by weight of a polyethylene oxide (PEO) powder as a binder and a suitable amount of water (or pure water) followed by kneading to prepare a hydrogen absorbing alloy slurry. Then, the hydrogen absorbing alloy slurry was coated on both surfaces of an electrically conductive core plate made of a punching metal applied with nickel plating on the surface thereof and having formed opening to provide a coated electrode. Thereafter, the coated electrode was dried at about 60° C. for 20 minutes and rolled up to a thickness of 0.6 mm to prepare a dry rolled electrode. In addition, the coated about of the hydrogen absorbing alloy slurry was controlled such that the density of the hydrogen absorbing alloy electrode after rolling became 5 $g/cm^3$.

Then, water or pure water was coated on the whole surface of the dry rolled electrode obtained to attach the water or pure water to the whole surface of the dry rolled electrode.

Thereafter, after natural-drying by allowing to stand at room temperature (about 25° C.) for about 2 hours, the electrode was cut into a definite size to prepare a hydrogen absorbing alloy electrode a of Example 1. In addition, the coated amount of water or pure water was 0.202 g (the coated amount was the value obtaining the difference in the weight of the electrode after coating and before coating) and became $3.29 \times 10^{-5}$ $g/mm^2$ per unit area of the electrode. Also, at coating water or pure water on the electrode after drying, a proper method such as a coating method by a brush, a coating method by spraying, or a coating method by roll, or the like may be employed by considering the productivity.

(2) EXAMPLE 2

After preparing a dry rolled-electrode by the same manner as in Example 1 described above, water or pure water was coated on the surface of the initiating portion, the portion disposed at the innermost-side, of rolling the dry rolled electrode obtained at the casing of forming a spiral-form electrode group to attach the water or pure water to the surface of the initiating portion of rolling the dry rolled electrode. Thereafter, after natural-drying by allowing to stand at room temperature (about 25° C.) for about 2 hours, the electrode was cut into a desired size to prepare the hydrogen absorbing alloy electrode of Example 2. In addition, the coated amount of water or pure water was 0.072 g (the coated amount was the value obtaining the difference in the weight of the electrode after coating and before coating) and became $3.29 \times 10^{-5}$ $g/mm^2$ per unit area of the electrode of the coated portion.

(3) EXAMPLE 3

After preparing a dry rolled electrode by the same manner as in Example 1 described above, water or pure water was coated on the surface of the end portion, the portion disposed outermost-side, of rolling the dry rolled electrode obtained at the casing of forming a spiral-form electrode group to attach the water or pure water to the surface of the end portion of rolling the dry rolled electrode. Thereafter, after natural-drying by allowing to stand at room temperature (about 25° C.) for about 2 hours, the electrode was cut into a desired size to prepare the hydrogen absorbing alloy electrode c of Example 3. In addition, the coated amount of water or pure water was 0.072 g (the coated amount was the value obtaining the difference in the weight of the electrode after coating and before coating) and became $3.29 \times 10^{-5}$ $g/mm^2$ per init area of the electrode of the coated portion.

(4) EXAMPLE 4

After preparing a dry rolled electrode by the same manner as in Example 1 described above, water or pure water was coated on the surface of the initiating portion and the end portion of rolling the dry rolled electrode obtained at the casing of forming a spiral-form electrode group to attach the water or pure water to the surface of the initiating portion and the end portion of rolling the dry rolled electrode. Thereafter, after natural-drying by allowing to stand at room temperature (about 25° C.) for about 2 hours, the electrode was cut into a desired size to prepare the hydrogen absorbing alloy electrode d of Example 4. In addition, the coated amount of water or pure water was 0.144 g (the coated amount was the value obtaining the difference in the weight of the electrode after coating and before coating) and became $3.29 \times 10^{-5}$ g/mm² per unit area of the electrode of the coated portions.

(5) COMPARATIVE EXAMPLE 1

After forming a coated electrode by coating a hydrogen absorbing alloy slurry on both surfaces of an electrically conductive core plate to form a coated electrode as in Example 1 and after natural-drying by allowing to stand at room temperature (about 25° C.) for about hours, the electrode was rolled up to a thickness of 0.6 mm to prepare a dry rolled electrode. In addition, the coating amount of the hydrogen absorbing alloy slurry was controlled such that the density of the hydrogen absorbing alloy electrode after rolling became 5 g/cm³. The dry rolled electrode thus obtained was cut into a definite size to prepare a hydrogen absorbing alloy electrode x of Comparative Example 1.

(6) COMPARATIVE EXAMPLE 2

After coating a hydrogen absorbing alloy slurry on both surfaces of an electrically conductive core plate as in Example 1 to form a coated electrode having formed an active material layers and after drying at about 60° C. for 20 minutes, the electrode was rolled at a thickness of 0.6 mm to prepare a dry rolled electrode. In addition, the coating amount of the hydrogen absorbing alloy slurry was controlled such that the hydrogen absorbing alloy density after rolling became 5 g/cm³. The dry rolled electrode thus obtained was cut into a definite size to prepare a hydrogen absorbing alloy electrode y of Comparative Example 2.

3. Preparation of Nickel-metal Hydride Battery:

Then, using each of the hydrogen absorbing alloy negative electrodes a to d of Examples 1 to 4 and the hydrogen absorbing alloy negative electrodes x and y of Comparative Examples 1 and 2 prepared as described above, each hydrogen absorbing alloy negative electrode and a well-known non-sintered nickel positive electrode were rolled via a separator made of an alkaline resisting nylon nonwoven fabric. In this casing, they were rolled in a spiral form such that the hydrogen absorbing alloy negative electrode became outside to prepare each spiral-form electrode group.

After inserting each spiral-form electrode group thus prepared into each bottom-having cylindrical metal-made outer casing, a three-component electrolyte comprising potassium hydroxide (KOH), lithium hydroxide (LiOH), and sodium hydroxide (NaOH) was poured in each metal-made outer casing followed by tightly sealing to prepare each nickel-metal hydride battery of ⅘ A size having a nominal capacity of 1700 mAh.

Now, the battery using the hydrogen absorbing alloy negative electrode a is named battery A, the battery using the hydrogen absorbing alloy b is named battery B, the battery using the hydrogen absorbing alloy c is named battery C, the battery using the hydrogen absorbing alloy d is named a battery D, the battery using the hydrogen absorbing alloy x is named battery X, and the battery using the hydrogen absorbing alloy y is named battery Y.

4. Measurement of Fallen Number of Active Material

Now, when in the casing of preparing one hundred batteries each of the nickel-hydrogen storage batteries A to D and X and Y described above, the number of the electrode groups, in each of which the hydrogen absorbing alloy was fallen off from the electrically conductive core plate in the casing of preparing the spiral-form electrode group, was measured, the results shown in following Table 2 were obtained. In addition, in Table 2 described below, the drying temperature and the drying time show he drying temperature and the drying time respectively of the coated electrode.

TABLE 2

| Kind of Battery | Drying Temp. (° C.) | Drying Time | Coating of Water (Pure Water) Coated or not | Coated Place | Fallen Number 3 |
|---|---|---|---|---|---|
| A | 60 | 20 minutes | Coated | Whole surface | 4 |
| B | 60 | 20 minutes | Coated | Initial portion of rolling | 4 |
| C | 60 | 20 minutes | Coated | End portion of rolling | 4 |
| D | 60 | 20 minutes | Coated | Initial and end portions of rolling | 3 |
| X | 25 | 6 hours | none | | 4 |
| Y | 60 | 20 minutes | none | | 40 |

As is clear from the results of Table 2 described above, it can be seen that by comparing the battery Y using the hydrogen absorbing alloy negative electrode x prepared by naturally drying the coated electrode at room temperature (about 25° C.) with the battery Y using the hydrogen absorbing alloy negative electrode y prepared by drying the coated electrode at about 60° C., the fallen number is reduced in the battery using the hydrogen absorbing alloy negative electrode x prepared by naturally drying.

This is considered to be as follows. That is, when the coated electrode is dried at a high temperature of about 60° C., drying of the negative electrode is finished in a short time of about 20 minutes, but because the drying speed is fast, the evaporation speed of water becomes fast, with the movement of the water contained in the hydrogen absorbing alloy layer, the water-soluble bonder is moved, and the water-soluble binder is omnipresent at the electrode surface (dried surface side) and is solidified. Thereby, the amount of the water-soluble binder in the hydrogen absorbing alloy layer in the vicinity of the electrically conductive core plate disposed at the center portion of the negative electrode is reduced, whereby the hydrogen absorbing alloy becomes liable to fall off.

On the other hand, when the coated electrode is naturally dried at room temperature (about 25° C.), because the drying speed is slow, the evaporation speed of the water in the hydrogen absorbing alloy layer becomes slow. Thereby, the water-soluble binder contained in the hydrogen absorbing alloy layer is solidified without moving, whereby the amount of the water-soluble binder in the hydrogen absorbing alloy layer in the vicinity of the conductive core plate disposed at the center portion of the negative electrode is not reduced and bonding strength of the conductive core plate and the hydrogen absorbing alloy is increased. However, because the drying speed is slow, a long time of about 6 hours is required until drying of the negative electrode is finished.

Also, it can be seen that in the battery A using the hydrogen absorbing alloy negative electrode a prepared, after drying the coated electrode at about 60° C., by coating water or pure water onto the whole surface of the dried electrode and by naturally drying at a room temperature (about 25° C.) lower than the above-described drying temperature, the battery B using the hydrogen absorbing alloy negative electrode b prepared by coating water or pure water onto the portion becoming the initiating portion of rolling the spiral-form electrode group of the dry electrode, the battery C using the hydrogen absorbing alloy negative electrode c prepared by coating water or pure water onto the end portion of rolling the spiral-form electrode group of the dry electrode, and the battery D using the hydrogen absorbing alloy negative electrode d prepared by coating water or pure water onto the initiating portion and the end portion of rolling the spiral-form electrode group of the dry electrode, the fallen numbers are reduced as the casing of the battery X.

This is considered to be as follows. That is, when water or pure water is attached to the surface of the dry electrode, because water or pure water permeates into the hydrogen absorbing alloy layer, the water-soluble binder solidified at the surface of the electrode at drying is re-dissolved, the re-dissolved water-soluble binder diffuses to the vicinity of the electrically conductive core plate to increase the concentration of the water-soluble binder in the vicinity of the conductive core plate. Thereafter, when the hydrogen absorbing alloy layer on the conductive core is dried at room temperature (about 25° C.) lower than the drying temperature in the above-described drying step, the diffused water-soluble binder is solidified, and at the solidification, the water-soluble binder diffused to the vicinity of the conductive core plate is also solidified without moving again, whereby the conductive core plate is strongly adhered to the hydrogen absorbing alloy. Thereby, the hydrogen absorbing alloy layer becomes hard to be peeled off and the occurrence of falling off of the hydrogen absorbing alloy can be prevented.

In addition, it can be seen that as to the coating site of water or pure water onto the surface of the dry electrode, because when the site is the whole surface of the dry electrode as in the battery A, the site is the portion becoming the initiating portion of rolling the spiral-form electrode group of the dry electrode as in the battery B, the site is the portion becoming the end portion of rolling the spiral-form electrode group of the dry electrode, or the portions becoming the initial portion and the end portion of rolling the spiral-form electrode group of the dry electrode, there are not so much differences in the fallen numbers, water or pure water may be coated on any site of these portions.

5. Investigation of the Coating Amount of Water (Pure Water):

In the examples described above, the relation of the coated site and the fallen number in the casing that the coating amount of pure water or water onto the surface of the dry electrode was a constant was investigated but the relation of the coated amount of pure water or water and the adhesive strength of the electrode was investigated below. In this casing, after preparing the dray electrode as in Example 1 described above, pure water or water coating on the whole surface of the dry electrode was coated by changing the coating amount thereof from 0 to $6 \times 10^{-5}$ g/mm² per unit area of the electrode. Then, after natural-drying each electrode having each coated amount of pure water or water by allowing to stand at room temperature (about 25° C.) for about 2 hours as in Example 1, each electrode was cut into a definite size to prepare each electrode 10 having a different coated amount of pure water or water after drying as shown in FIG. 2.

In addition, a electrode 10 shown in FIG. 2 is equipped with an electrically conductive core-plate 11 made of a punching metal at the center portion thereof and on both the surfaces of the conductive core plate 11 are formed hydrogen absorbing alloy layers 12 and 13 respectively. After grinding the surface of a hydrogen absorbing alloy layer 12 on one surface of each electrode 10, the ground surface was lightly rubbed with a waste to remove the ground dust on the surface. Thereafter, after holding a cutter (not shown) at an angle of about 30 degree to the hydrogen absorbing alloy layer 12 of each electrode 10, by applying a load of about 250 g to the edge of the cutter, kerfs x, y were formed by notching the hydrogen absorbing alloy layer 12. In addition, the interval of the kerfs x or y was 1 mm, and ten kerfs x and ten kerfs y were formed by crossing each other at a right angle.

By forming ten kerfs x and ten kerfs y crossing each other at a right angle, one hundred meshes were form in a check pattern. Then, using ten plates each of the electrode 10 having formed the one hundred meshes of a check pattern, after raising each plate to a height of about 100 mm such that the hydrogen absorbing alloy layers 12 and 13 became perpendicular, each poly plate 10 was free-fallen. In addition, the fallen number of the axis of ordinate of FIG. 5 shows the fallen number of the pieces of the meshes and the few fallen number means the strength of the electrode, that is, the adhesive force of the electrically conductive core plate 11 and each of the hydrogen absorbing alloy layer layers 12 and 13 is strong.

Figure 5:
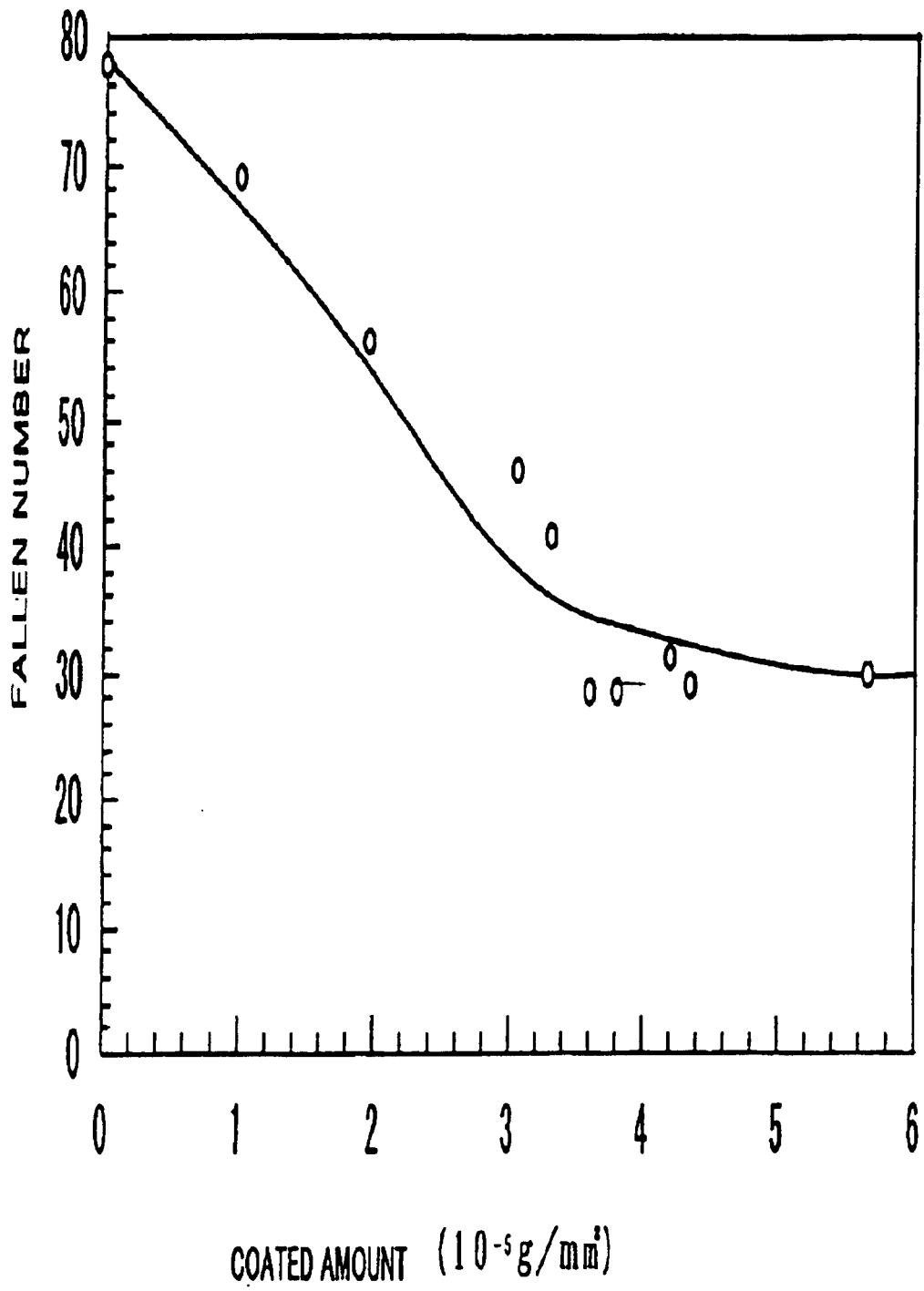
FIG. 5 is a graph showing the relation of the coated amount of water (pure water) and the electrode strength (fallen number).

As is clear from the results of FIG. 5, it can be seen that with the increase of the coated amount of pure water or water, the fallen number is linearly reduced, when the coated amount exceeds $3 \times 10^{-5}$ g/mm² per unit area of the electrode, the reducing amount of the fallen number is lowered, and when the coated amount exceeds $5 \times 10^{-5}$ g/mm² per unit area of the electrode, the fallen number becomes almost constant. Also, the coated amount becomes large as exceeding $5 \times 10^{-5}$ g/mm² per unit area of the electrode, the drying time after coating becomes long. Accordingly, it can be said to be preferred that the coating amount of pure water or water is $3 \times 10^{-5}$ g/mm² or more but $5 \times 10^{-5}$ g/mm² or less.

As described above, in the present invention, even when the productivity is improved by drying quickly the electrode, because by attaching pure water or water to the surface of the dry electrode, the water-soluble binder solidified at drying is re-dissolved and solidified, the electrically conductive core plate is strongly adhered to the hydrogen absorbing alloy and the hydrogen absorbing alloys are strongly adhered to each other. As the result thereof, the hydrogen absorbing alloy layer becomes hard to be peeled off and the occurrence of falling off of the hydrogen absorbing alloy can be prevented, whereby an alkaline storage battery of a high quality excellent in the productivity can be obtained.

In addition, in the above-described embodiments, the examples of using the hydrogen absorbing alloy obtained by replacing a part of Ni shown by $Mn_aNi_bCo_cMn_dAl_e$ with Co, Mn, Al as the hydrogen absorbing alloy were explained but the hydrogen absorbing alloy obtained by replacing a part of Ni with Co and Cu, Fe, Cr, Si, Mo, etc., may be used. Also, other than the hydrogen absorbing alloys shown by $Mn_aNi_bCo_cMn_dAl_e$, such as $AB_5$ type rare earth element-base hydrogen absorbing alloys, for example, the hydrogen absorbing alloy obtained by replacing a part of Ni of an $LaNi_5$-base hydrogen absorbing alloy with Co and Al, W, etc., may be used. Also, in the above-described embodiments, the examples of using the hydrogen absorbing alloy powder obtained by mechanically pulverizing were explained, but the hydrogen absorbing alloy powder produced by an atomizing method or the hydrogen absorbing alloy mixed the power obtained by mechanically pulverizing and the powder obtained by an atomizing method may be used in the invention.

Third Embodiment

When the hydrogen absorbing alloy powder having a mean particle size of not larger than 60 μm is coated on the electrically conductive core plate at a packing density of at least 4.85 g/cm$^3$, the hydrogen absorbing alloy electrode of a high capacity is formed. When an alkaline storage battery is constructed using such a negative electrode of a high capacity, the capacity ratio of an alkaline storage battery is increased so that the reserve amount of the battery increase. As the result, an alkaline storage battery of a long life, which is excellent in the charge discharge cycle characteristics can be provided. In this casing, when the hydrogen absorbing alloy powders each other or the hydrogen absorbing alloy powder and the electrically conductive core plate are adhered with the binder capable of re-dissolving, even when the binder capable of re-dissolving is crazed, the binder is re-dissolved with a solvent for the binder (for example, pure water or water in the casing of a water-soluble binder), whereby the hydrogen absorbing alloy powder becomes hard to be peeled off and the occurrence of falling off of the hydrogen absorbing alloy powder can be prevented. In addition, when the mean particle size of the hydrogen absorbing alloy powder becomes too small, cracking of the alloy by charging and discharging becomes hard to occur and an active surface of the alloy becomes hard to occur. As the result, the internal resistance caused by the contact resistance is raised, and thus, it is desirable that the lower limit of the mean particle size of the hydrogen absorbing alloy powder is 20 μm.

Also, the method of producing a hydrogen absorbing alloy electrode of the present invention, for improving the mechanical strength of the hydrogen absorbing alloy electrode even by attaching a hydrogen absorbing alloy powder having a mean particle size of not larger than 60 μm onto an electrically conductive core plate at a packing density of at least 4.85 g/cm$^3$, includes a coating step of attaching an active material slurry comprising a hydrogen absorbing alloy powder having a mean particle size of not larger than 60 μm, a binder capable of re-dissolving on the above-described electrically conductive core plate to provide a slurry-coated electrode, a drying step of drying the slurry-coated electrode to provide a dry electrode, a pressing step of pressing the dry electrode to provide a pressed electrode, and a solvent-attaching step of attaching the above-described solvent for binder to the surface of the pressed electrode.

As in the invention, when a solvent for the binder capable of re-dissolving (for example, pure water or water in the casing of a water-soluble binder) is attached to the surface of the dry electrode, the solvent for the binder permeates into the hydrogen absorbing alloy layer and the binder is re-dissolved, whereby after re-dissolving the binder having craze caused at rolling, the dissolved binder is solidified and the particles each other of the hydrogen absorbing alloy powder and the electrically conductive core plate and the hydrogen absorbing alloy powder are strongly adhered. Thereby, the hydrogen absorbing alloy layer becomes hard to be peeled off and the occurrence of falling off of the hydrogen absorbing alloy powder can be prevented. In addition, when the electrode attached with the solvent is dried, it is desirable to dry the electrode at a temperature (40° C. or lower) lower than the drying temperature in the previous drying step.

Also, by including a binder-coating step of coating a binder solution comprising a binder capable of re-dissolving and a solvent for the binder onto the above-described electrically conductive core plate, a coating step of coating an active material slurry containing a hydrogen absorbing alloy powder having a mean particle size of not larger than 60 μm onto the electrically conductive core plate coated with the binder to provide a slurry-coated electrode, a drying step of drying the slurry-coated electrode to provide a dry electrode, a pressing step of pressing the dry electrode to provide a press electrode, and a solvent-attaching step of attaching the solvent for the binder to the surface of the press electrode, the occurrence of falling off the hydrogen absorbing alloy powder can be prevented. This is because when the active material slurry is coated to the electrically conductive core plate coated with the solvent capable of re-dissolving, the binder capable of re-dissolving diffuses in the active material slurry to adhere the particles each other of the hydrogen absorbing alloy powder and adhere the conductive core plate and the hydrogen absorbing alloy powder.

In addition, when after drying the electrode coated with the slurry and rolling, the solvent for binder is coated on the surface of the dry electrode followed by drying, a phenomenon of roughing the surface of the hydrogen absorbing alloy electrode occurred. Accordingly, when the hydrogen absorbing alloy electrode was rolled in a spiral form such that the hydrogen absorbing alloy electrode was disposed at the outermost peripheral portion and a rolling tape was stuck to the outermost peripheral portion, a problem that the rolling tape was hard to stick to the hydrogen absorbing alloy electrode of the outermost peripheral portion. Thus, in the invention, the solvent for binder was coated on the surface of the dry electrode and after drying at a low temperature, the electrode was re-pressed. Thereby, the occurrence of the roughing phenomena caused at attaching the solvent for binder to the surface of the electrode can be restrained.

In this case, it is necessary to prevent the occurrence of a discrepancy among the particles each other of the hydrogen absorbing alloy powder and between the electrically conductive core plate and the hydrogen absorbing alloy powder by re-pressing, but because when the pressing force is within 10% of a thickness of above described press electrode, the effect of attaching the solvent for binder to the surface of the electrode can be maintained, it is desirable that the pressing force at re-pressing is within 10% of the definite thickness. In addition, the hydrogen absorbing alloy electrode of the invention can be applied to alkaline storage batteries of any systems but it is particularly effective to apply to an alkaline storage battery equipped with the electrode group formed by alternately laminating negative electrodes coated with the hydrogen absorbing alloy powder and positive electrodes via separators.

Then, an embodiment of the invention is explained.

1. Preparation of Hydrogen Absorbing Alloy Powder:

Commercially available metal elements (Mm, Ni, Co, Al, and Mn) (in addition, Mm is a mischmetal) were weighed and mixed such that they became as $MmNi_{3.4}Co_{0.8}Al_{0.2}Mn_{0.6}$. After melting the mixture of the metal elements in a high-frequency blast furnace, the melt was poured into a mold and cooled to produce an ingot of a hydrogen absorbing alloy comprised of $MmNi_{3.4}Co_{0.8}Al_{0.2}Mn_{0.6}$. After roughly pulverizing the ingot of the hydrogen absorbing alloy, the particles were mechanically pulverized in an atmosphere mainly containing an inert gas to prepare a hydrogen absorbing alloy powder. In addition, the hydrogen absorbing alloy powder mechanically group such that the mean particle size thereof became 30 μm (the mean particle value was the value measured by a laser diffraction method) was named hydrogen absorbing alloy powder α. Similarly, the hydrogen absorbing alloy powder ground at a mean particle size of 50 μm was named hydrogen absorbing alloy powder β, the hydrogen absorbing alloy powder ground at a mean particle size of 70 μm was named hydrogen absorbing alloy powder γ, and the hydrogen absorbing alloy powder ground at a mean particle size of 90 μm was named hydrogen absorbing alloy powder δ.

2. Preparation of Hydrogen Absorbing Alloy Electrode:

(1) EXAMPLE 1

Using the hydrogen absorbing alloy α (the hydrogen absorbing alloy powder having a mean particle size of 30 μm) prepared as described above, to 99% by weight of the hydrogen absorbing alloy α were added a polyethylene oxide (PEO) powder as a water-soluble binder in an amount of 1% by weight to the amount of the hydrogen absorbing alloy powder and a proper amount of water (or pure water) as a solvent for the water-soluble bonder followed by kneading to prepare a hydrogen absorbing alloy slurry. Then, by coating the hydrogen absorbing alloy slurry to both the surfaces of an electrically conductive core plate made of a punching metal having applied nickel plating to the surface thereof and having formed openings to form a slurry-coated electrode.

Thereafter, after drying at about 60° C. for 20 minutes to form a dry electrode, the dry electrode was pressed to a definite thickness to prepare a dry pressed electrode. Then, water (or pure water (a solvent for the water-soluble binder (PEO)) was coated (pure water treatment) on the whole surface of the dry pressed electrode obtained to attach water or pure water to an extent of wetting the whole surface of the dry pressed electrode. Thereafter, after natural-drying at room temperature (about 25° C.) for about 2 hours, the plate was re-pressed at a pressing force of decreasing the thickness of the dry pressed electrode by 5% to prepare a re-pressed electrode. In addition, the coating amount of the hydrogen absorbing alloy slurry was controlled such that the hydrogen absorbing alloy density after re-pressing became 5.10 g/cm$^3$ and the thickness became about 0.5 mm. By cutting the re-pressed electrode into a definite size, the hydrogen absorbing alloy electrode a of Example 1 was prepared.

(2) EXAMPLE 2

An electrically conductive core plate made of a punching metal having applied nickel plating to the surface thereof and having formed opening was dipped in a binder solution formed by dissolving a polyethylene oxide (PEO) powder in a solvent (pure water or water) for the water-soluble binder to coat polyethylene oxide (PEO) on both surfaces of the conductive core plate. Thereafter, to 99% by weight of the hydrogen absorbing alloy α (the hydrogen absorbing alloy powder having a mean particle size of 30 μm) were added carboxymethyl cellulose (CMC) as a thickener in an amount of 1% by weight to the amount of the hydrogen absorbing alloy powder and a proper amount of water (pure water) as the solvent for the thickener followed by kneading to prepare a hydrogen absorbing alloy slurry. Then, the hydrogen absorbing alloy slurry was coated on both surface of the conductive core plate coated with PEO to form a coated electrode.

Thereafter, after drying-the-coated electrode at about 60° C. for 20 minutes to form a dry electrode, the electrode was pressed to a definite thickness to prepare a dry pressed electrode. Then, water or purer water (a solvent for the water-soluble binder (PEO)) was coated (pure water treatment) on the whole surface of the dry pressed electrode obtained to attach water or pure water to an extent of wetting the whole surface of the dry pressed electrode. Thereafter, after natural-drying at room temperature (about 25° C.) for about 2 hours, the plate was re-pressed at a pressing force decreasing the thickness of the dry pressed electrode by 5% to prepare a re-pressed electrode. In addition, the coating amount of the hydrogen absorbing alloy slurry was controlled such that the density of the hydrogen absorbing alloy electrode after re-pressing became 5.10 g/cm$^3$ and the thickness became about 0.5 mm. By cutting the re-pressed electrode into a definite size, the hydrogen absorbing alloy electrode b of Example 2 was prepared.

(3) EXAMPLE 3

After preparing the dry pressed electrode by the same manner as in above-described Example 1, water or pure water (the solvent for the water-soluble binder (PEO)) was coated (pure water treatment) on the whole surface of the dry pressed electrode obtained to attach water or pure water to an extent of wetting the whole surface of the dry pressed electrode. Thereafter, after natural-drying at room temperature about 25° C.) for about 2 hours, the plate was re-pressed at a pressing force of decreasing the thickness of the dry pressed electrode by 10% to prepare a re-pressed electrode. In addition, the coating amount of the hydrogen absorbing alloy slurry was controlled such that the density of the hydrogen absorbing alloy electrode after re-pressing became 5.10 g/cm$^3$ and the thickness became about 0.5 mm. By cutting the re-pressed electrode into a definite size, the hydrogen absorbing alloy electrode c of Example 3 was prepared.

In addition, in each of the examples described above, in the casing of pure water treating, by considering the productivity, and the like, water or pure water was attached to the whole surface of the dry pressed electrode by employing a proper method such as a coating method by a brush, a coating method by spraying, or a coating method by roll, or the like.

(4) COMPARATIVE EXAMPLE 1

After preparing the dry pressed electrode by the same manner as in above-described Example 1, without coating water or pure water (a solvent for the water-soluble binder (PEO)) on the dry pressed electrode obtained, the dry pressed electrode was cut into a definite size to prepare the hydrogen absorbing alloy electrode r of Comparative Example 1. In addition, the coating amount of the hydrogen absorbing alloy slurry was controlled such that the hydrogen absorbing alloy density after pressing became 5.10 g/cm$^3$ and the thickness became about 0.5 mm.

(5) COMPARATIVE EXAMPLE 2

After preparing the dry pressed electrode by the same manner as in above-described Example 2, without coating water or pure water (a solvent for the water-soluble binder (PEO)) on the dry pressed electrode obtained, the dry pressed electrode was cut into a definite size to prepare the hydrogen absorbing alloy electrode s of Comparative Example 2. In addition, the coating amount of the hydrogen absorbing alloy slurry was controlled such that the density of the hydrogen absorbing alloy electrode after pressing became 5.10 g/cm³ and the thickness became about 0.5 mm.

(6) COMPARATIVE EXAMPLE 3

After preparing the dry pressed electrode by the same manner as in above-described Example 1, without coating water or pure water (a solvent for the water-soluble binder (PEO)) on the dry pressed electrode obtained, the dry pressed electrode was cut into a definite size to prepare the hydrogen absorbing alloy electrode t of Comparative Example 3. In addition, the coating amount of the hydrogen absorbing alloy slurry was controlled such that the density of the hydrogen absorbing alloy electrode after pressing became 4.85 g/cm³ and the thickness became about 0.5 mm.

(7) COMPARATIVE EXAMPLE 4

Using the hydrogen absorbing alloy β (the hydrogen absorbing alloy powder having a mean particle size of 50 μm) prepared as described above, after preparing the dry pressed electrode by the same manner as in above-described Example 1, without coating water or pure water (a solvent for the water-soluble binder (PEO)) on the dry pressed electrode obtained, the dry pressed electrode was cut into a definite size to prepare the hydrogen absorbing alloy electrode t of Comparative Example 4. In addition, the coating amount of the hydrogen absorbing alloy slurry was controlled such that the density of the hydrogen absorbing alloy electrode after pressing became 4.85 g/cm³ and the thickness became about 0.5 mm.

(8) COMPARATIVE EXAMPLE 5

Using the hydrogen absorbing alloy β (the hydrogen absorbing alloy powder having a mean particle size of 70 μm) prepared as described above, after preparing the dry pressed electrode by the same manner as in above-described Example 1, without coating water or pure water (a solvent for the water-soluble binder (PEO)) on the dry pressed electrode obtained, the dry pressed electrode was cut into a definite size to prepare the hydrogen absorbing alloy electrode u of Comparative Example 5. In addition, the coating amount of the hydrogen absorbing alloy slurry was controlled such that the density of the hydrogen absorbing alloy electrode after pressing became 4.85 g/cm³ and the thickness became about 0.5 mm.

(9) COMPARATIVE EXAMPLE 6

Using the hydrogen absorbing alloy δ (the hydrogen absorbing alloy powder having a mean particle size of 90 μm) prepared as described above, after preparing the dry pressed electrode by the same manner as in above-described Example 1, without coating water or pure water (a solvent for the water-soluble binder (PEO)) on the dry pressed electrode obtained, the dry pressed electrode was cut into a definite size to prepare the hydrogen absorbing alloy electrode v of Comparative Example 6. In addition, the coating amount of the hydrogen absorbing alloy slurry was controlled such that the density of the hydrogen absorbing alloy electrode after pressing became 4.85 g/cm³ and the thickness became about 0.5 mm.

(10) COMPARATIVE EXAMPLE 7

Using the hydrogen absorbing alloy β (the hydrogen absorbing alloy powder having a mean particle size of 50 μm) prepared as described above, after preparing the dry pressed electrode by the same manner as in above-described Example 1, without coating water or pure water (a solvent for the water-soluble binder (PEO)) on the dry pressed electrode obtained, the dry pressed electrode was cut into a definite size to prepare the hydrogen absorbing alloy electrode x of Comparative Example 7. In addition, the coating amount of the hydrogen absorbing alloy slurry was controlled such that the density of the hydrogen absorbing alloy electrode after pressing became 5.10 g/cm³ and the thickness became about 0.5 mm.

(11) COMPARATIVE EXAMPLE 8

Using the hydrogen absorbing alloy γ (the hydrogen absorbing alloy powder having a mean particle size of 70 μm) prepared as described above, after preparing the dry pressed electrode by the same manner as in above-described Example 1, without coating water or pure water (a solvent for the water-soluble binder (PEO)) on the dry pressed electrode obtained, the dry pressed electrode was cut into a definite size to prepare the hydrogen absorbing alloy electrode y of Comparative Example 8. In addition, the coating amount of the hydrogen absorbing alloy slurry was controlled such that the density of the hydrogen absorbing alloy electrode after pressing became 5.10 g/cm³ and the thickness became about 0.5 mm.

(12) COMPARATIVE EXAMPLE 9

Using the hydrogen absorbing alloy δ (the hydrogen absorbing alloy powder having a mean particle size of 90 μm) prepared as described above, after preparing the dry pressed electrode by the same manner as in above-described Example 1, without coating water or pure water (a solvent for the water-soluble binder (PEO)) on the dry pressed electrode obtained, the dry pressed electrode was cut into a definite size to prepare the hydrogen absorbing alloy electrode z of Comparative Example 9. In addition, the coating amount of the hydrogen absorbing alloy slurry was controlled such that the density of the hydrogen absorbing alloy electrode after pressing became 5.10 g/cm³ and the thickness became about 0.5 mm.

3. Preparation of Nickel-metal Hydride Battery:

Then, using each of the hydrogen absorbing alloy electrodes a to c of Examples 1 to 3 and the hydrogen absorbing alloy electrodes r to z Comparative Examples 1 to 9 prepared as described above, each hydrogen absorbing alloy electrode and a well-known non-sintered nickel positive electrode were rolled via a separator made of an alkaline resisting nylon-made nonwoven fabric. In this casing, they were rolled in a spiral form such that the hydrogen absorbing alloy electrode became outside to prepare each spiral-form electrode group. After inserting each spiral-form electrode group thus prepared into each bottom-having cylindrical metal-made outer casing, a three-component electrolyte comprising potassium hydroxide (KOH), lithium hydroxide (LiOH), and sodium hydroxide (NaOH) was poured in each bottom-having cylindrical metal-made outer casing followed by tightly sealing to prepare each of nickel-hydrogen storage batteries A, B, C, R, S, T, U, V, W, X, Y, and Z of ⅘ A size having a nominal capacity of 1700 mAh.

In this casing, the battery using the hydrogen absorbing alloy electrode a was name battery A, the battery using the hydrogen absorbing alloy electrode b was named battery B, the battery using the hydrogen absorbing alloy electrode c was named battery C, the battery using the hydrogen absorbing alloy electrode r was named battery R, the battery using the hydrogen absorbing alloy electrode s was named battery S, the battery using the hydrogen absorbing alloy electrode t was name battery T, the battery using the hydrogen absorbing alloy electrode u was name battery U, the battery using the hydrogen absorbing alloy electrode v was named battery V, the battery using the hydrogen absorbing alloy electrode w was named battery W, the battery using the hydrogen absorbing alloy electrode x was named battery X, and the battery using the hydrogen absorbing alloy electrode y was named battery Y.

4. Measurements of Fallen of Number of Active Materials and Rolling Gap Number:

When in the casing of preparing one hundred batteries each of the nickel-hydrogen storage batteries A to C and R to Z as described above, the number of the electrode groups, in which the hydrogen absorbing alloy powder was fallen off from each of the electrodes a, b, c, r, s, t, u, v, w, x, and y at the preparation of the spiral-form electrode groups, and the number of the rolling gap occurred in the each spiral-form electrode group were measured, the results shown in Tables 1 to 4 described below were obtained.

(1) Relation of Mean Particle Size of Hydrogen Absorbing Alloy Powder and Numbers of Fallen Active Materials and Caused Rolling Gaps:

In this casing, when the packing density of the active material was equally fixed to be 4.85 g/cm$^3$, and the mean particle size of the hydrogen absorbing alloy powder was changed to 30 μm (the hydrogen absorbing alloy electrode t), 50 μm (the hydrogen absorbing alloy electrode u), and 90 μm (the hydrogen absorbing alloy electrode w), the fallen number of the active material and the number of caused rolling gaps were counted and the results shown Table 3 below were obtained.

becomes small, the fallen number of the active material is increased, and on the other hand, the number of caused rolling gaps is reduced.

This is considered to be that when the hydrogen absorbing alloy electrode is pressed until the packing density becomes 4.85 g/cm$^3$, as the mean particle size of the hydrogen absorbing alloy powder is small, the binder of adhering the hydrogen absorbing alloys each other and adhering the hydrogen absorbing alloy powder and the electrically conductive core plate is cracked, whereby the active material becomes liable to be fallen off. On the other hand, as the mean particle size of the hydrogen absorbing alloy powder becomes large, the waviness and creases occur in the hydrogen absorbing alloy electrode pressed at the packing density of 4.85 g/cm$^3$.

Also, when the packing density of the active material was increased and fixed equally to 5.10 g/cm$^3$, and the mean particle size of the hydrogen absorbing alloy was changed to 30 μm (the hydrogen absorbing alloy electrode r), 50 μm (the hydrogen absorbing alloy electrode x), 70 μm (the hydrogen absorbing alloy electrode y), and 90 μm (the hydrogen absorbing alloy electrode z), the fallen number of the active materials and the number of the caused rolling gaps were

TABLE 3

| Kind of Electrode | Pure Water Treatment | Added Place of Binder | Packing Density (g/cm$^3$) | Mean Particle Size (μm) | Re-Pressing | Fallen Number | Rolling Gap Number |
|---|---|---|---|---|---|---|---|
| t | none | Slurry | 4.85 | 30 | none | 50 | 2 |
| u | none | Slurry | 4.85 | 50 | none | 43 | 3 |
| v | none | Slurry | 4.85 | 70 | none | 31 | 9 |
| w | none | Slurry | 4.85 | 90 | none | 19 | 33 | calculated and the results shown in Table 4 below were obtained.

TABLE 4

| Kind of Electrode | Pure Water Treatment | Added Place of Binder | Packing Density (g/cm$^3$) | Mean Particle Size (μm) | Re-Pressing | Fallen Number | Rolling Gap Number |
|---|---|---|---|---|---|---|---|
| r | None | Slurry | 5.10 | 30 | None | 78 | 5 |
| x | None | Slurry | 5.10 | 50 | None | 63 | 24 |
| y | None | Slurry | 5.10 | 70 | None | 44 | 37 |
| z | None | Slurry | 5.10 | 90 | None | 38 | 62 |

As is clear from the results of Table 3 described above, it can be seen that in the casing of preparing the hydrogen absorbing alloy electrode of the packing density of the hydrogen absorbing alloy powder of 4.85 g/cm$^3$, as the mean particle size of the hydrogen absorbing alloy powder used is increased, the fallen number of the active material is reduced, but on the other hand the caused number of the rolling gaps is increased, and speaking on the contrary, as the mean particle size of the hydrogen absorbing alloy powder As is clear from the results of above-described Table 4, it can be seen that even in the casing of preparing the hydrogen absorbing alloy electrode of the packing density of the hydrogen absorbing alloy powder of 5.10 g/cm$^3$, as the mean particle size of the hydrogen absorbing alloy powder used becomes small, the fallen number of the active materials is increased, and on the other hand, the occurred number of the rolling gaps is reduced.

Also, as is clear from the results of Table 3 and Table 4 described above, it can be seen that even when the mean particle sizes of the hydrogen absorbing alloy powders are same, when the packing density of the hydrogen absorbing alloy powder is increased from 4.85 g/cm$^3$ to 5.10 g/cm$^3$, the fallen number of the active materials and the caused number of the rolling gaps are increased. This is considered to be that when the hydrogen absorbing alloy powder having a small mean particle size is packed at a high density, the number of the hydrogen absorbing alloy powders per unit volume is increased and the rolling load is increased because of the high packing density, whereby the binder adhering the hydrogen absorbing alloy powders each other or adhering the hydrogen absorbing alloy powder and the electrically conductive core plate becomes liable to be cracked and the hydrogen absorbing alloy powders each other and the hydrogen absorbing alloy powder and the conductive core plate become liable to be more slipped.

(2) Relation of Pure Water Treatment and Numbers of Fallen Active Materials and Caused Rolling Gaps:

Furthermore, using the hydrogen absorbing alloy powder having a mean particle size of 30 µm, the packing density of the active material was equally fixed to be 5.10 g/cm$^3$, and when the fallen number of the active materials and the number of the caused rolling gaps of the hydrogen absorbing alloy electrode $\underline{a}$ applied with the pure water treatment (the electrode, wherein a binder was contained in the slurry and re-pressing was 5%), the hydrogen absorbing alloy electrode $\underline{b}$ applied with the pure water treatment (the electrode, wherein the core plate was coated with a bonder and re-pressing was 5%), the hydrogen absorbing alloy element $\underline{c}$ applied with the pure water treatment (the electrode, wherein a binder was contained in the slurry and the re-pressing was 10%), the hydrogen absorbing alloy electrode $\underline{r}$ without being applied with the pure water treatment (the electrode, wherein a binder was contained in the slurry), and the hydrogen absorbing alloy electrode $\underline{s}$ without being applied with the pure water treatment (the electrode, wherein the core plate was coated with a binder) were counted and the results as shown in Table 5 below were obtained.

hydrogen absorbing alloy layer and the water-soluble binder (PEO) is re-dissolved, the water-soluble binder cracked at pressing is re-dissolved, thereafter, when the hydrogen absorbing alloy layer is dried at a temperature (40° C. or lower is desirable) lower than the previous drying step, the dissolved water-soluble binder is solidified, whereby the hydrogen absorbing alloy powders each other and the electrically conductive core plate and the hydrogen absorbing alloy powder are strongly adhered. Thereby, the hydrogen absorbing alloy layer becomes hard to be peeled off and the occurrence of falling off of the hydrogen absorbing alloy powder can be prevented.

In addition, by comparing the hydrogen absorbing alloy element $\underline{a}$ (or the hydrogen absorbing alloy electrode $\underline{r}$), in which the water-soluble binder is contained in the slurry) with the hydrogen absorbing alloy electrode $\underline{b}$ (or the hydrogen absorbing alloy electrode $\underline{s}$), in which the binder is previously coated on the electrically conductive core plate, it can be seen that the fallen numbers of the active materials are not so different. This is considered to be that even when the binder is previously coated on the conductive core plate, the water-soluble binder is dissolved in the slurry at coating the slurry, the hydrogen absorbing alloy powders each other and the conductive core plate and the hydrogen absorbing alloy powder are strongly adhered.

In addition, when after attaching pure water or water to the surface of the dry pressed electrode, the dry electrode is dried, a phenomenon that the surface of the hydrogen absorbing alloy electrode is roughened occurs. Thereby, there occurs a problem that when the hydrogen absorbing alloy electrode is rolled in a spiral-form such that the hydrogen absorbing alloy electrode is disposed at the outermost periphery, and a rolling tape is stuck to the outermost peripheral portion, the rolling tape is hard to stick to the hydrogen absorbing alloy electrode of the outermost periphery. Thus, in the invention, pure water or water is coated on the surface of the dry electrode, and after drying at a low temperature, the dry electrode is re-pressed, whereby the

TABLE 5

| Kind of Electrode | Pure Water Treatment | Added Place of Binder | Packing Density (g/cm$^3$) | Mean Particle Size (µm) | Re-Pressing | Fallen Number | Rolling Gap Number |
|---|---|---|---|---|---|---|---|
| $\underline{a}$ | Treated | Slurry | 5.10 | 30 | 5% | 2 | 4 |
| $\underline{b}$ | Treated | Core plate coated | 5.10 | 30 | 5% | 2 | 5 |
| $\underline{c}$ | Treated | Slurry | 5.10 | 30 | 10% | 9 | 4 |
| $\underline{r}$ | None | Slurry | 5.10 | 30 | None | 78 | 5 |
| $\underline{s}$ | None | Core plate coated | 5.10 | 30 | None | 82 | 5 |

As is clear from the results of Table 5 described above, it can be seen that the fallen numbers of the active materials of the hydrogen absorbing alloy electrodes $\underline{r}$ and $\underline{s}$, which did not apply the pure water treatment to the dry pressed electrodes, were many as 78/100 and 82/100 respectively, while the fallen number of the active materials of the hydrogen absorbing alloy electrodes a, b, and c, which applied the pure water treatment to the dry pressed electrodes, were reduced as 2/100, 2/100, and 9/100 respectively.

This considered to be that because when pure water or water is coated on the surface of the dry electrode and is attached thereto, pure water or water permeates into the occurrence of the roughening phenomenon caused after the pure water treatment can be restrained.

In this case, it is necessary that a discrepancy does not occur amount the hydrogen absorbing alloy powders each other and between the electrically conductive core plate and the hydrogen absorbing alloy powder by re-pressing, but as clear from the results of above-described Table 5, because when the pressing force is within 10% of a definite thickness, the effect of the pure water treatment can be maintained, it is desirable that the pressing force at re-pressing is within 10% of the definite thickness.

5. Measurement of the Strength of the Hydrogen Absorbing Alloy Electrode:

Then using each of the hydrogen absorbing alloy electrodes a and b of Examples 1 and 2 and the hydrogen absorbing alloy electrodes r and s of Comparative Examples 1 and 2 prepared as described above, the attaching strength of each of these hydrogen absorbing alloy electrodes was measured. In addition, in the strength measurement, as shown in FIG. 2, after grinding the surface of the hydrogen absorbing alloy layer 12 of each electrode 10 (in addition, in the electrode 10, the hydrogen absorbing alloy layers 12 and 13 were formed on both surfaces of the electrically conductive core plate 11 respectively), by lightly rubbing the ground surface with a waste to remove the ground dust. Thereafter, after holding a cutter (not shown) at an angle of a right angle to the surface of the hydrogen absorbing alloy layer 12 of each of these electrodes 10, by applying a load of about 250 g to the edge of the cutter, kerfs x and y were formed by notching the hydrogen absorbing alloy layer 12. In addition, the intervals of the kerfs x or of the kerfs y was 1 mm, and ten kerfs x and ten kerfs y were formed as crossing at a right angle with each other.

Then, by forming ten kerfs x and ten kerfs y as crossing at a right angle with each other, one hundred meshes were formed in a check pattern. Then, using ten electrodes 10 each having formed one hundred meshes in a check pattern, after raising each electrode to a position of about 100 mm such that the hydrogen absorbing alloy layers 12 and 13 became perpendicular, each electrode 10 was let free-fall. After repeatedly carrying out the falling test three times, when the fallen number of the pieces of the meshes formed on each electrode 10 was counted, and the average value thereof was obtained, the results were as shown in Table 6 below.

TABLE 6

| Kind of Electrode | Pure Water Treatment | Added Place of Binder | Packing Density (g/cm$^3$) | Mean Particle Size ($\mu$m) | Re-Pressing | Fallen Number |
|---|---|---|---|---|---|---|
| a | Applied | Slurry | 5.10 | 30 | 5% | 1 |
| b | Applied | Core plate coated | 5.10 | 30 | 5% | 2 |
| r | None | Slurry | 5.10 | 30 | None | 65 |
| s | None | Core plate Coated | 5.10 | 30 | None | 68 |

As is clear from the results of above-described Table 6, it can be seen that the fallen numbers of the active materials of the hydrogen absorbing alloy electrodes r and s, in which the pure water treatment was not applied to the dry pressed electrodes, are many as 65/100 and 68/100 respectively, while the fallen numbers of the active materials of the hydrogen absorbing alloy electrodes a and b, in which the pure water treatment was applied to the dry pressed electrodes, are greatly reduced as 1/100 and 2/100 respectively.

This is considered to be that because when pure water or water is coated on the surface of the dry pressed electrode and is attached thereto, pure water or water permeates into the hydrogen absorbing alloy layer and the water-soluble binder is re-dissolved, the water-soluble binder cracked at pressing is re-dissolved, thereafter, when the hydrogen absorbing alloy layer is dried at a temperature (40° C. or lower is desirable) lower than the previous drying step, the dissolved water-soluble binder is solidified, whereby the hydrogen absorbing alloy powders each other and the electrically conductive core plate and the hydrogen absorbing alloy powder are strongly adhered. Thereby, the hydrogen absorbing alloy layer becomes hard to be peeled off and the occurrence of falling off of the hydrogen absorbing alloy powder can be prevented.

As described above, in the present invention, because pure water or water is coated on the surface of the dry pressed electrode and attached thereto, even when the hydrogen absorbing alloy powder having a mean particle size of not larger than 60 $\mu$m is attached to the electrically conductive core plate at a high packing density of at least 4.85 g/cm$^3$, the hydrogen absorbing alloy layer becomes hard to be peeled off and the occurrence of falling off of the hydrogen absorbing alloy powder can be prevented. Thereby, because the hydrogen absorbing alloy electrode becomes the hydrogen absorbing alloy electrode having a high capacity, when an alkaline storage battery is constructed using such a hydrogen absorbing alloy electrode of a high capacity, the capacity ratio of the negative electrode is increased and the reserve amount is increased, whereby an alkaline storage battery excellent in the charge discharge cycle characteristics and having a long life can be provided.

In addition, in the above-described embodiments, the examples of using $MmNi_{3.4}Co_{0.8}Al_{0.2}Mn_{0.6}$ as the hydrogen absorbing alloy were explained but the hydrogen absorbing alloy used in the invention is not limited to $MmNi_{3.4}Co_{0.8}Al_{0.2}Mn_{0.6}$, the hydrogen absorbing alloy shown by $Mm_aNi_bCo_cAl_dMn_e$ (wherein, when a=1, the formula has the relation of $4.5 \leq b+c+d+e \leq 5.5$) may be used. In this casing, the hydrogen absorbing alloy obtained by replacing a part of Ni of by $Mm_aNi_bCo_cAl_dMn_e$ with Co, Mn, Al or the hydrogen absorbing alloy obtained by replacing a part of Ni of by $Mm_aNi_bCo_cAl_dMn_e$ with Co and Cu, Fe, Cr, Si, Mo, etc., can be used.

Also, other than the hydrogen absorbing alloys shown by $Mm_aNi_bCo_cAl_dMn_e$ such as $AB_5$ type rare earth element-base hydrogen absorbing alloys, for example, the hydrogen absorbing alloy obtained by replacing a part of Ni of an $LaNi_5$-base hydrogen absorbing alloy with Co and Al, W, etc., may be used. Also, in the above-described embodiments, the examples of using the hydrogen absorbing alloy powder obtained by mechanically grinding were explained, but the hydrogen absorbing alloy prepared by an atomizing method or a mixed powder obtained by mixing the hydrogen absorbing alloy powder with other ground alloy may be used in the invention.

Also, in the embodiments described above, examples of using polyethylene oxide (PEO) as the water-soluble binder were explained but the water-soluble binder used in the invention is not limited to polyethylene oxide (PEO), and other water-soluble binders such as hydroxypropyl cellulose (HPC), an unsaturated polyester resin (aerosil), methyl cellulose (MC), carboxymethyl cellulose (CMC), polyvinyl alcohol (PVA), polyvinyl pyrrolidone (PUP), polyacrylic acid, polyacrylamide, crosslinked starch, sodium acrylate, sodium alginate, sodium silicate, and the like may be used. Furthermore, the binder is not limited to water-soluble binders and other binders may be used. In this casing, however, in place of the pure water treatment, it is necessary to attach a solvent for the binder used to the dry pressed electrode.

What is claimed is:

1. A method of producing an alkaline storage battery comprising an electrode group having a plurality of alternately stacked positive and negative electrodes, each electrode comprising a perforated core plate having two surfaces holding an active material, the electrodes separated via separators, which electrode group is placed in a metal outer casing, wherein the core plates of the electrodes disposed at an outermost side of the electrode group are exposed and wherein the exposed core plates are in contact with the metal outer casing, said method comprising:

(a) coating an active material slurry comprising a hydrogen absorbing alloy as an active material, a water-soluble binder, and a solvent for the water-soluble binder onto both surfaces of the core plate to form an electrode;

(b) drying the electrode coated with the active material slurry;

(c) removing the active material of the side of the exposed surface of the core plate; and (d) applying the water-soluble solvent for the binder to the exposed surface side of the core plate.

2. The method of producing an alkaline storage battery of claim 1 wherein in step (b) the electrode coated with the active material slurry is dried at room temperature.

3. A method of producing an alkaline storage battery comprising an electrode group having a plurality of alternately stacked positive and negative electrodes, each electrode comprising a perforated core plate having two surfaces holding an active material, the electrodes separated via separators, which electrode group is placed in a metal outer casing, wherein the core plates of the electrodes disposed at an outermost side of the electrode group are exposed and wherein the exposed core plates are in contact with the metal outer casing, said method comprising:

(a) coating an active material slurry comprising a hydrogen absorbing alloy as an active material, a water-soluble binder, and a solvent for the water-soluble binder onto both surfaces of the core plate to form an electrode;

(b) drying the electrode coated with the active material slurry;

(c) applying a solvent for the water-soluble binder to the active material layer side forming the exposed surface of the core plate thereby softening the active material; and (d) removing the softened active material from the side forming the exposed surface of the core plate.

4. The method of producing an alkaline storage battery of claim 3, wherein the active material is removed in step (d), after the solvent for the binder is applied in step (c) and before the solvent has dried.

5. The method of producing an alkaline storage battery of claim 3 wherein in step (b) the electrode coated with the active material slurry is dried at room temperature.

6. A method of producing an alkaline storage battery comprising an electrode group having a plurality of alternately stacked positive and negative electrodes, each electrode comprising a perforated core plate having two surfaces holding an active material, the electrodes separated via separators, which electrode group is placed in a metal outer casing, wherein the core plates of the electrodes disposed at an outermost side of the electrode group are exposed and wherein the exposed core plates are in contact with the metal outer casing, said method comprising:

(a) coating an active material slurry comprising a hydrogen absorbing alloy as an active material, a water-soluble binder, and a solvent for the water-soluble binder onto a core plate;

(b) drying the electrode coated with the active material slurry; and (c) applying the solvent for the water-soluble binder to the dried electrode.

7. The method of producing an alkaline storage battery of claim 6 wherein in step (b) the electrode coated with the active material slurry is dried at room temperature.

* * * * *